US012625095B1

(12) United States Patent
Ryan et al.

(10) Patent No.: US 12,625,095 B1
(45) Date of Patent: May 12, 2026

(54) X-RAY SCANNER WITH BLANKING

(71) Applicant: Viken Detection Corporation, Burlington, MA (US)

(72) Inventors: James P. Ryan, Bedford, MA (US); John P. O'Connor, Andover, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

(21) Appl. No.: 18/633,142

(22) Filed: Apr. 11, 2024

Related U.S. Application Data

(60) Provisional application No. 63/495,410, filed on Apr. 11, 2023.

(51) Int. Cl.
*G01N 23/04* (2018.01)
*G01N 23/20008* (2018.01)
*G01N 23/203* (2006.01)

(52) U.S. Cl.
CPC ..... *G01N 23/20008* (2013.01); *G01N 23/203* (2013.01); *G01N 2223/20* (2013.01); *G01N 2223/33* (2013.01); *G01N 2223/50* (2013.01)

(58) Field of Classification Search
None
See application file for complete search history.

(56) References Cited

U.S. PATENT DOCUMENTS

| | | | |
|---|---|---|---|
| 4,342,914 A | 8/1982 | Bjorkholm | |
| 6,094,472 A | 7/2000 | Smith | |
| 6,151,381 A | 11/2000 | Grodzins et al. | |
| 6,459,761 B1 | 10/2002 | Grodzins et al. | |
| 6,459,764 B1 | 10/2002 | Chalmers et al. | |
| 7,400,701 B1 | 7/2008 | Cason | |
| 7,555,099 B2 | 6/2009 | Rothschild et al. | |
| 7,593,510 B2 | 9/2009 | Rothschild | |
| 7,995,707 B2 | 8/2011 | Rothschild et al. | |
| 8,270,566 B2 | 9/2012 | McNabb, Jr. et al. | |
| 8,300,763 B2 | 10/2012 | Shedlock | |
| 9,031,196 B2 | 5/2015 | McNabb, Jr. et al. | |
| 10,762,998 B2 | 9/2020 | Rothschild | |
| 2007/0147585 A1* | 6/2007 | Eilbert | G01T 1/2928 378/57 |

(Continued)

FOREIGN PATENT DOCUMENTS

| | | |
|---|---|---|
| EP | 2049888 B1 | 5/2014 |
| WO | 99/39189 | 8/1999 |

(Continued)

OTHER PUBLICATIONS

Chtcheprov et al., "Physiologically gated microbeam radiation using a field emission x-ray source array," Med. Phys. 41 (8), Aug. 2014, 081705-1-081705-8.

(Continued)

*Primary Examiner* — Hoon K Song
(74) *Attorney, Agent, or Firm* — Merchant & Gould P.C.

(57) ABSTRACT

An X-ray scanning system includes: an X-ray source configured to irradiate a target with source X-rays in the course of relative motion between the X-ray source and the target; a feature sensor configured to sense a feature of the target in the course of the relative motion; and a communication interface operatively coupled to the feature sensor and configured to output a blanking signal responsive to the feature sensor sensing the feature of the target.

27 Claims, 20 Drawing Sheets

(56) References Cited

U.S. PATENT DOCUMENTS

| | | | |
|---|---|---|---|
| 2009/0175412 A1 | 7/2009 | Grodzins et al. | |
| 2009/0279664 A1* | 11/2009 | McNabb, Jr. | G01T 7/005 |
| | | | 378/62 |
| 2014/0044233 A1* | 2/2014 | Morton | G01N 23/20008 |
| | | | 378/62 |
| 2016/0003967 A1 | 1/2016 | Chen et al. | |
| 2016/0187526 A1* | 6/2016 | Kang | G01N 23/10 |
| | | | 378/57 |
| 2017/0242148 A1* | 8/2017 | Yu | G06V 30/424 |
| 2018/0328861 A1 | 11/2018 | Grodzins et al. | |
| 2022/0268713 A1 | 8/2022 | Carrington | |
| 2023/0251209 A1 | 8/2023 | Bendahan | |
| 2025/0110067 A1* | 4/2025 | Faugier | G01N 23/04 |

FOREIGN PATENT DOCUMENTS

| | | | |
|---|---|---|---|
| WO | 2005/098400 A2 | 10/2005 | |
| WO | 2012/174265 A1 | 12/2012 | |

OTHER PUBLICATIONS

RadiologyInfo.org, "Linear Accelerator," downloaded Jul. 28, 2023, 3 pages (https://www.radiologyinfo.org/en/info/linac).

Rapiscan Systems/AS&E, "Z Portal for Passenger Vehicles, Multi-view, Multi-technology, Cargo, and Vehicle Screening Systems", downloaded Jul. 27, 2023, 3 pages (https://www.rapiscan-ase.com/products/portal/z-portal-for-passenger-vehicle-screening).

Rapiscan Systems/AS&E, "Z Portal for Trucks and Cargo, Multi-view, Multi-technology, Cargo, and Vehicle Screening Systems", downloaded Jul. 27, 2023, 3 pages (https://www.rapiscan-ase.com/products/portal/z-portal-for-trucks-cargo-screening).

Rapiscan Systems/AS&E, "Radiation Detection Products", downloaded Jul. 27, 2023, 3 pages (https://www.rapiscan-ase.com/radiation-detection-products).

Leidos, "Exploranium Radiation Portal Monitors", downloaded Jul. 27, 2023, 4 pages (https://www.leidos.com/products/exploranium).

* cited by examiner

X-Ray Beam-Forming Module 658c

502

Rotating Hoop 643

Fan Beam 538

X-Ray Beam-Forming Module 658b

502

Rotating Wheel 642

X-Ray Beam-Forming Module 658a

X-Ray Tube 502

Fan Beam 538

Rotating Disk 542

Motor 660

Slit Aperture 544

Scanning
Cone Beam
764

Scanning
Motion 766

Stationary
Cone Beam
762

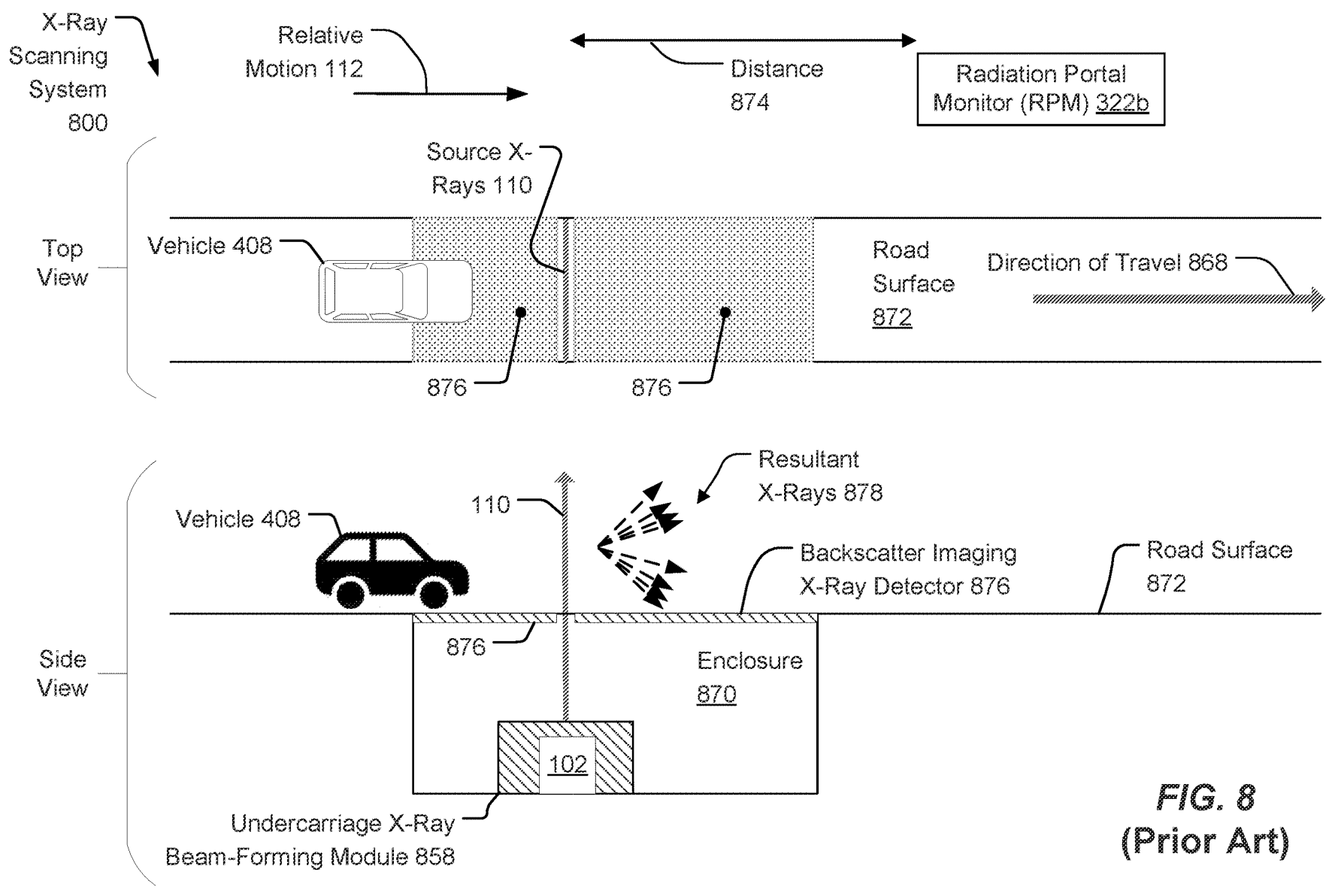

X-Ray Scanning System 800

Radiation Portal Monitor (RPM) 322b

Relative Motion 112

Distance 874

Top View

Source X-Rays 110

Vehicle 408

876

876

Road Surface 872

Direction of Travel 868

Side View

Resultant X-Rays 878

Backscatter Imaging X-Ray Detector 876

Road Surface 872

110

876

Enclosure 870

102

Vehicle 408

Undercarriage X-Ray Beam-Forming Module 858

FIG. 8
(Prior Art)

Figure 11:
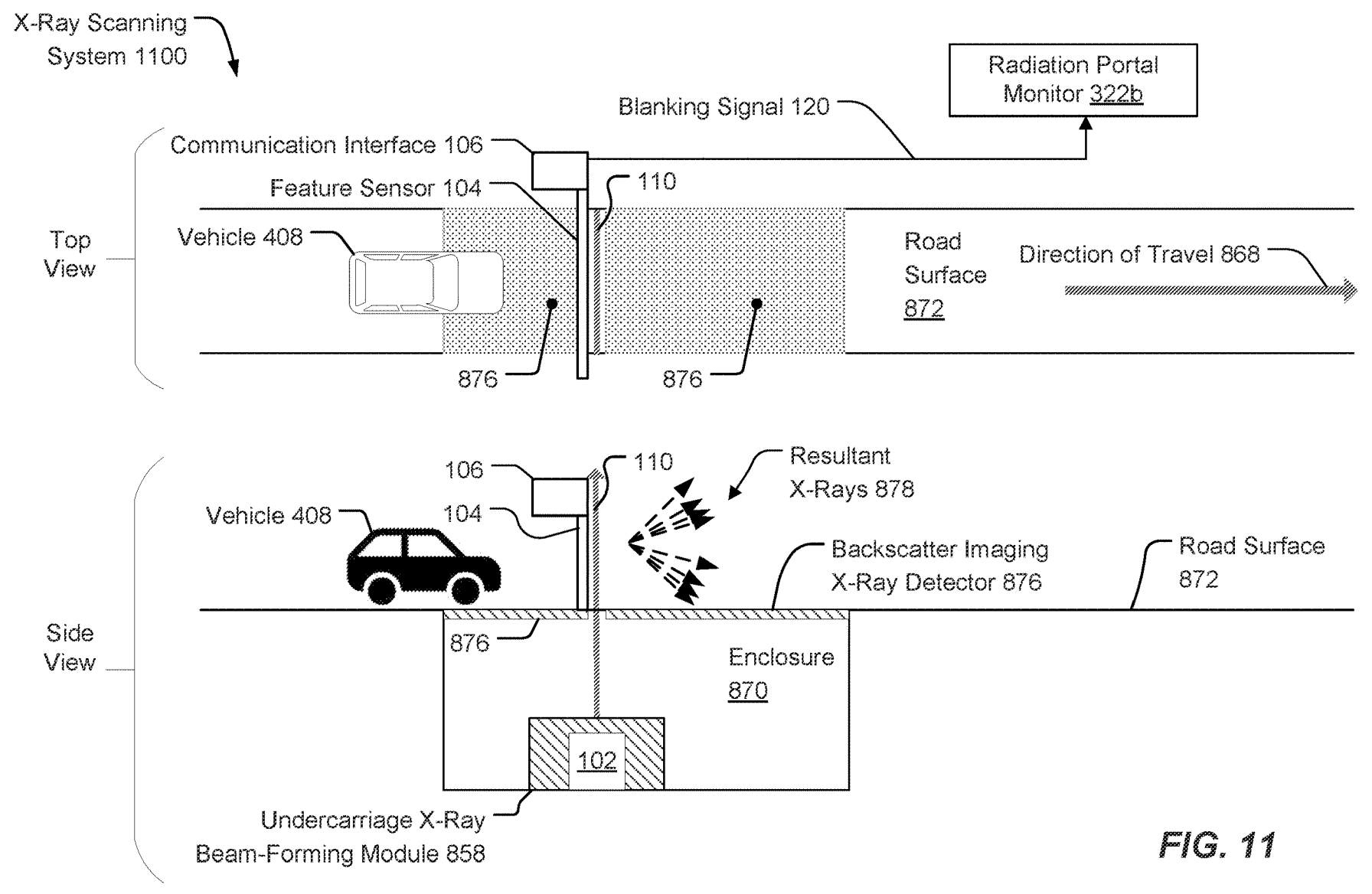

X-Ray Scanning System 1100

Radiation Portal Monitor 322b

Blanking Signal 120

Direction of Travel 868

Road Surface 872

Communication Interface 106

Feature Sensor 104

Vehicle 408

110

876

876

Top View

Resultant X-Rays 878

Backscatter Imaging X-Ray Detector 876

Road Surface 872

Enclosure 870

110

106

104

Vehicle 408

876

102

Undercarriage X-Ray Beam-Forming Module 858

Side View

Irradiate a target with source X-rays from an X-ray source in the course of relative motion between the X-ray source and the target

1920

Sense a feature of the target in the course of the relative motion

1930

Communicate a blanking signal responsive to the sensing the feature of the target

1900

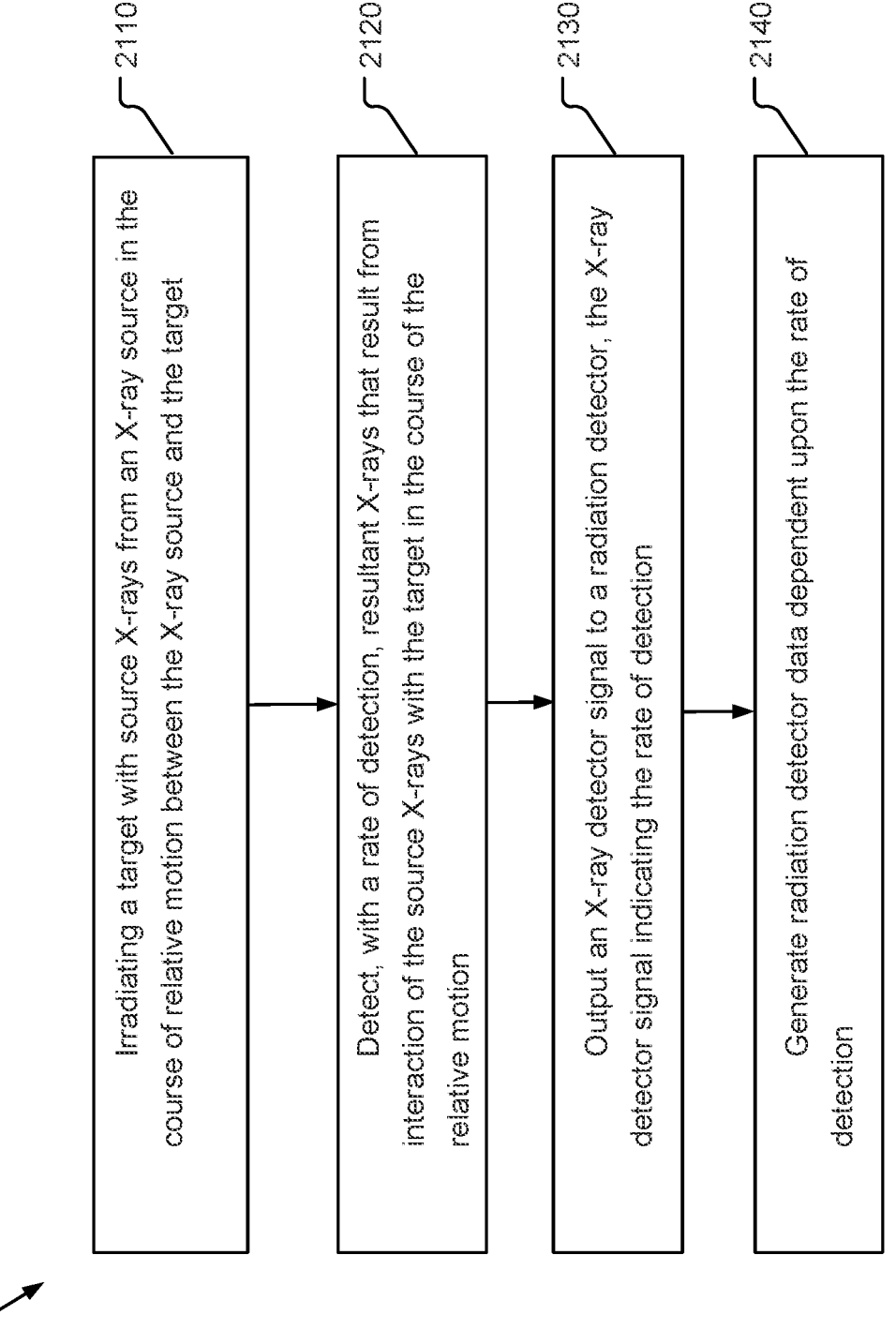

2100

2110

Irradiating a target with source X-rays from an X-ray source in the course of relative motion between the X-ray source and the target

2120

Detect, with a rate of detection, resultant X-rays that result from interaction of the source X-rays with the target in the course of the relative motion

2130

Output an X-ray detector signal to a radiation detector, the X-ray detector signal indicating the rate of detection

2140

Generate radiation detector data dependent upon the rate of detection

FIG. 21

X-RAY SCANNER WITH BLANKING

RELATED APPLICATION

This application claims the benefit of U.S. Provisional Application No. 63/495,410, filed on Apr. 11, 2023. The entire teachings of the above application are incorporated herein by reference.

TECHNICAL FIELD

This application relates to X-ray scanning systems, and related methods, that can include use of a blanking mechanism, such as a blanking signal. The blanking signal can be responsive to sensing a particular feature of the target to be scanned using a feature sensor, or responsive to a certain threshold value for an X-ray detector signal provided by an X-ray detector used for X-ray imaging. The blanking function can cause a radiation detector to pause accumulation of radiation detection data to avoid spurious detection of X-rays scattered toward the radiation detector. The systems can include X-ray scanning apparatus intended to scan luggage, packages, shipping containers, vehicles (e.g., vehicle portals), people, etc.

BACKGROUND

X-ray scanning is used in a wide variety of settings, including in vehicle portals, in container scanning at ports, in airport luggage scanners, etc. Types of X-ray scanners include transmission X-ray scanning systems, backscatter X-ray scanning systems, and X-ray scanning systems that perform transmission scanning and backscatter scanning simultaneously. X-ray sources used in such system can include continuously operating X-ray sources (e.g., X-ray tubes) and linear accelerators (LINACs). Radiation portal monitors (RPMs) can be installed at border crossings and ports to detect the presence of illicit radioactive materials concealed within vehicles or shipping containers.

SUMMARY

In one aspect, this disclosure generally relates to a system and method to reduce interference of continuously operating X-ray scanning systems with radiation detectors such as radiation portal monitors (RPMs).

Various aspects can include X-ray scanning systems for scanning targets (such as X-ray backscatter imaging systems, including X-ray detection systems in the form of undercarriage vehicle scanners, wherein an underside of a vehicle is the target), radiation detectors such as RPMs, and RPM radiation detector blanking. Vehicle X-ray scanning portals are one environment in which disclosed features can be used advantageously. In one aspect, RPM radiation detector blanking can include causing an radiation detector, such as an RPM, to cease or pause detection activity (or accumulation of radiation detector data, such as in software) while the X-ray detection systems is scanning a highly scattering target or portion of a target, such as a bumper or windshield of a vehicle.

Blanking may result from a blanking signal sent to the RPM or other radiation detector. The blanking signal can come directly from a sensor that is configured to detect directly the highly scattering target or portion (feature) thereof. Alternatively, a sensor may provide a raw sensor signal to another part of the X-ray scanning system, such as a controller having a processor, and the controller can act on the sensor signal, and the blanking signal can be output from the X-ray scanning system to the RPM or other radiation detector. The blanking signal can be carried by wired or wireless means that are known.

In accordance with a first particular embodiment, an X-ray scanning system includes: an X-ray source configured to irradiate a target with source X-rays in the course of relative motion between the X-ray source and the target; a feature sensor configured to sense a feature of the target in the course of the relative motion; and a communication interface operatively coupled to the feature sensor and configured to output a blanking signal responsive to the feature sensor sensing the feature of the target.

In accordance with a second particular embodiment, an X-ray scanning system includes: an X-ray source configured to irradiate a target with source X-rays in the course of relative motion between the X-ray source and the target; an X-ray detector configured (i) to detect resultant X-rays that result from interaction of the source X-rays with the target in the course of the relative motion, and (ii) to output an X-ray detector signal indicating a rate of detection of the resultant X-rays; a controller configured to receive the X-ray detector signal and to determine whether the rate of detection exceeds a threshold; and a communication interface operatively coupled to the controller and configured to output a blanking signal responsive to the rate of detection exceeding the threshold.

In accordance with a third particular embodiment, an X-ray scanning system includes: an X-ray source configured to irradiate a target with source X-rays in the course of relative motion between the X-ray source and the target; an X-ray detector configured (i) to detect resultant X-rays that result from interaction of the source X-rays with the target in the course of the relative motion, and (ii) to output an X-ray detector signal indicating a rate of detection of the resultant X-rays; and a radiation detector subsystem configured to receive the X-ray detector signal and to generate radiation detection data dependent upon the rate of detection.

In accordance with a fourth particular embodiment, a method of X-ray scanning includes: irradiating a target with source X-rays from an X-ray source in the course of relative motion between the X-ray source and the target; sensing a feature of the target in the course of the relative motion; and communicating a blanking signal responsive to the sensing the feature of the target.

In accordance with a fifth particular embodiment, a method of X-ray scanning includes: irradiating a target with source X-rays from an X-ray source in the course of relative motion between the X-ray source and the target; detecting, with a rate of detection, resultant X-rays that result from interaction of the source X-rays with the target in the course of the relative motion; determining whether the rate of detection exceeds a threshold; and outputting a blanking signal responsive to the rate of detection exceeding the threshold.

In accordance with a sixth particular embodiment, a method of X-ray scanning includes: irradiating a target with source X-rays from an X-ray source in the course of relative motion between the X-ray source and the target; detecting, with a rate of detection, resultant X-rays that result from interaction of the source X-rays with the target in the course of the relative motion; outputting an X-ray detector signal to a radiation detector, the X-ray detector signal indicating the rate of detection; and generating radiation detector data dependent upon the rate of detection.

BRIEF DESCRIPTION OF THE DRAWINGS

FIG. 8 (prior art) is a diagram illustrating an existing vehicle portal system with problems that can be solved by embodiments of the present disclosure.

FIG. 11 is a diagram of an example X-ray scanning system, in the form of a vehicle portal and consistent with the embodiment of FIG. 1.

FIG. 21 is a flow diagram illustrating a method of X-ray scanning according to an embodiment, which may be performed using the X-ray scanning system of FIG. 15.

DETAILED DESCRIPTION OF SPECIFIC EMBODIMENTS

Definitions

Figure 1:
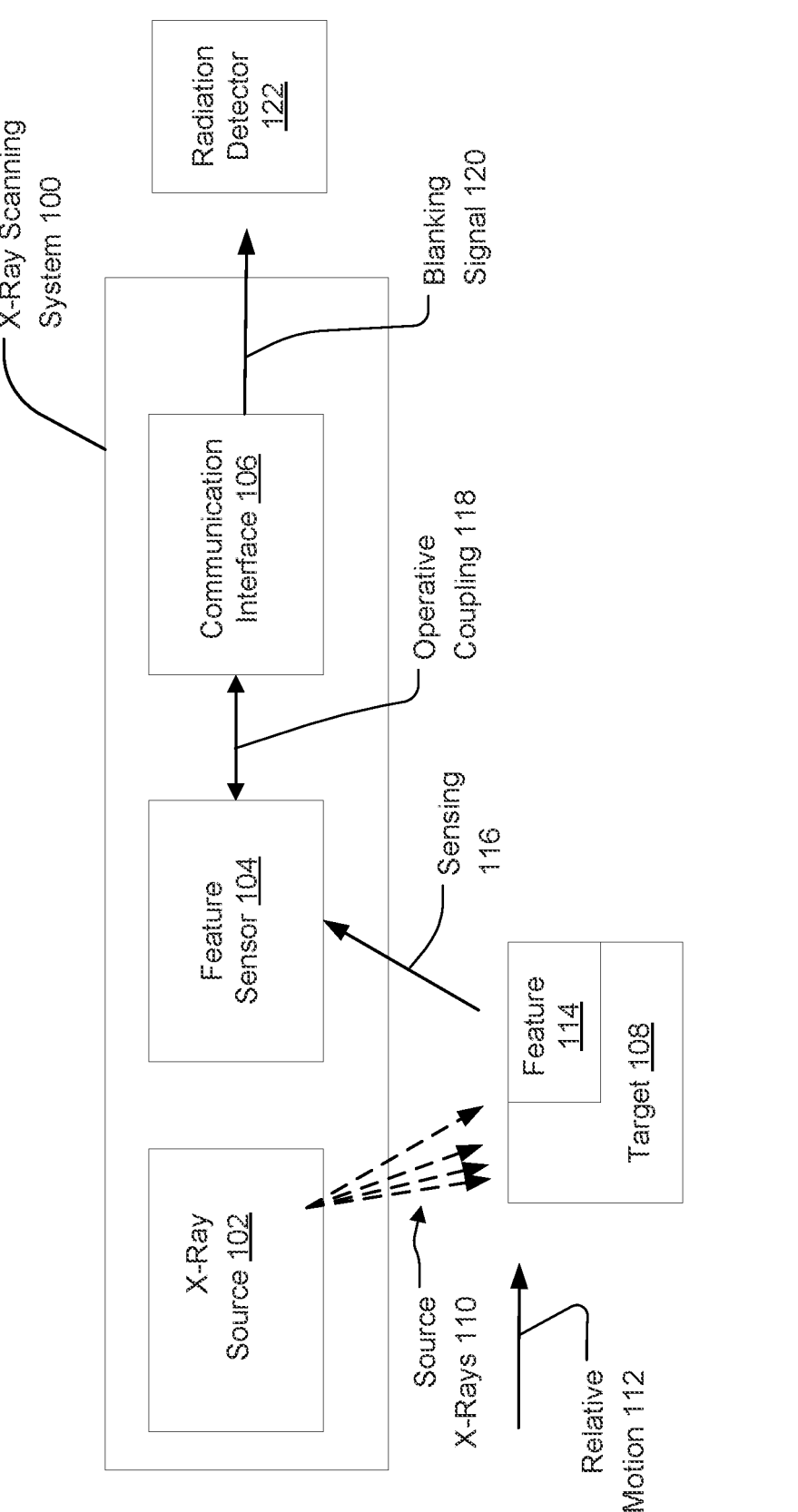
FIG. 1 is a block diagram illustrating an X-ray scanning system that utilizes a feature sensor, according to an embodiment.

As used in this description and the accompanying claims, the following terms shall have the meanings indicated, unless the context otherwise requires:

"Set." A "set" includes at least one member.

"Target object," "target," and "object" are used interchangeably herein and refer to a subject that may be scanned by an x-ray scanner for imaging or sensed for any passive radiation emitted from the subject.

"Active," "activated," and ON are used interchangeably herein in relation to a state of a blanking signal.

"Inactive," "inactivated," and OFF are used interchangeably herein in relation to a state of a blanking signal.

A "blanking signal," as used herein, may have an ON state, resulting in a pause of radiation data collection by a radiation detector; and/or an OFF state, resulting in resumption or continuation of radiation data collection by the radiation detector.

A "wired signal," as used herein, can be electronic or optical.

A "wireless signal," as used herein, can be radio frequency or optical.

As used herein, an "auxiliary scattering X-ray detector" is an X-ray detector that is configured to detect resultant X-rays that are scattered, and whose output X-ray detector signal is not used for X-ray imaging. Instead, the X-ray detector signal output from the auxiliary scattering X-ray detector is used only to determine whether there is excessive X-ray scattering that may interfere with operation of a radiation detector.

A "vehicle," as used herein, can be a car, truck, van, tractor-trailer, motorcycle, trailer, or combination.

Introduction

Disclosed herein are a method and apparatus to reduce the level of interference from an X-ray detection system such as an X-ray backscatter apparatus impacting a radiation detector, such as a radiation portal monitor (RPM). Hereinafter, in relation to certain embodiments, the disclosure refers to an RPM by way of an example. Nonetheless, it should be understood that other types of radiation detectors that are within the scope of this disclosure more broadly include radioisotope identifiers, personal radiation detectors, dosimeters, a gamma ray detector, a neutron detector, a radioactive contamination monitor, an alpha particle detector, a beta particle (also known as beta ray) detector, a dirty bomb detector, a handheld detector, detector designed to detect radioactive or fissile material, or a combination of one or more of these. It should be understood that embodiments can include one or more detectors of this broader range of detectors, either as part of an RPM, or instead of an RPM, as applicable.

RPMs can be installed at border crossings and ports to detect the presence of illicit radioactive materials concealed within vehicles or shipping containers. RPMs typically include large volumes of plastic scintillating material such as PVT optically coupled to Photomultiplier Tubes (PMTs) that detect the scintillation light when x-rays or gamma rays deposit their energy in the plastic. The amount of scintillation light produced is proportional to the energy of the absorbed x-ray or gamma ray. By measuring the intensity of all the output current pulses produced by the PMTs, an energy spectrum of the absorbed photons can be produced.

RPMs are usually quite large so that they can be sensitive enough to detect weak radioactive sources (typically 5,000-25,000 cm3 of plastic scintillator). The large size also makes them very sensitive to interference from any nearby x-ray source. This is not a problem for pulsed x-ray sources such as linear accelerators (LINACs) that are used in multi-MeV high-energy x-ray imaging, as the pulses from LINACs are so short (e.g., a few microseconds) and so intense that they can easily be detected and blanked out using software. This is not the case, however, for continuous-beam x-ray sources, such as those used in x-ray backscatter imaging (with continuous sweeping pencil beams) or traditional x-ray transmission imaging (with continuous fan beams of radiation). For these continuous-beam sources, the RPMs are typically separated from the x-ray imaging systems by hundreds of feet to prevent any significant interference. At border crossings or ports where space is at a premium, this is often not possible, and it is certainly not desirable.

An RPM system can be used to detect nuclear materials that may be smuggled across ports of entry at borders between countries, for example. For effectiveness, RPMs can be designed to be extremely sensitive to the presence of nuclear materials, such as those that emit ionizing radiation, such as materials that may be used to construct a dirty bomb.

X-ray detection systems, such as X-ray backscatter scanning systems, may also be employed at ports of entry to detect contraband such as illegal drugs, weapons, or cash that are attempted to be smuggled across the border.

X-ray detection systems can produce scattered X-rays that may cause RPMs to produce signals that are not related to nuclear materials, thus interfering with effective operation of the RPMs. To minimize the impact of the scattered radiation upon the sensitivity of the RPM, various approaches may be employed. For example, the RPM may be physically located a significant distance from the X-ray system to reduce the scattered X-rays to acceptable levels. Shielding of the RPM or the X-ray detection system may also be used to reduce the level of interference. Traffic management of the vehicles may also be used to scan vehicles with the RPM only when there are no vehicles being scanned in the X-ray detection system.

All of the above techniques of reducing interference suffer from various drawbacks, such as significant additional expense, inconvenience, impact of increasing system size, and system weight of additional shielding materials.

A further approach is to use a technique called blanking. In this approach, typically used for pulsed X-ray systems, the RPM is turned off when the pulses of X-rays are generated. This can enable the RPM to be fully activated except when the pulses of X-rays are produced and can effectively eliminate the interference. However, for continuously operating X-ray scanning systems, such as X-ray backscatter scanning systems, blanking of the RPMs in the according to the known blanking technique is problematic, as the scanning X-rays typically are continuously operating when a vehicle is being scanned.

Accordingly, better systems and methods are needed to mitigate interference between X-ray detection systems and RPMs or other radiation detectors.

According to embodiments described herein, a modified blanking approach can be used with continuously operating X-ray scanning systems, such as X-ray backscatter scanning systems, even while still limiting any interference of the scanning X-rays with the RPM to below acceptable levels.

A first embodiment is shown in FIGS. 1-4. This embodiment includes an under-vehicle X-ray generation system.

As shown, the X-ray detection system includes an X-ray source mounted inside an enclosure, e.g., a concrete vault, under the ground. This X-ray source creates a pencil beam or fan beam of scanning X-rays that exits from the vault in a vertical direction. If the scanning X-rays exiting the vault impact upon a target object such as a motor vehicle, a certain fraction of the X-rays will be scattered backwards and detected in an array of detectors mounted just under a surface of the roadway.

Certain Example Embodiments

FIG. 1 is a block diagram illustrating an X-ray scanning system 100, according to an embodiment. The X-ray scanning system 100 includes an X-ray source 102, a feature sensor 104, and a communication interface 106. The X-ray source 102 is configured to irradiate a target 108 with source X-rays 110 in the course of relative motion 112 between the X-ray source 102 and the target 108. The feature sensor 104 is configured to sense a feature 114 of the target 108 in the course of the relative motion 112, as depicted by a sensing action 116 illustrated with an arrow. The communication interface 106 is operatively coupled to the feature sensor 104, with an operative coupling 118, as depicted by a double-sided arrow. The communication interface 106 is configured to output a blanking signal 120 responsive to the feature sensor 104 sensing the feature 114 of the target.

FIG. 1 further illustrates a radiation detector 122. While not a required part of the X-ray scanning system 100, certain implementations can be used in connection with, and/or include, the radiation detector 122. The blanking signal 120 can optionally be output to and received by the radiation detector 122. The radiation detector 122 can receive the blanking signal 120 and pause an accumulation of radiation data of the radiation detector 122 responsive to the blanking signal 120. Examples of the blanking signal 120 and uses thereof are described further hereinafter.

In various implementations, the X-ray source 110 can be an X-ray tube or a linear accelerator (LINAC).

In various implementations, the target 108 is a vehicle, an article of luggage, package, another non-human object, a human, or a set of two or more of these examples.

In various implementations, the X-ray source can form part of an X-ray beam-forming module with additional components that may shape the source the source X-rays 110 into beams of various shapes and/or cause an incident position of the source X-rays 110 at the target 108 to sweep along a scan line or in another patter. Various beam shapes can include a scanning pencil beam, a stationary cone beam, a scanning cone beam, and a stationary fan beam.

FIGS. 2A-2D are diagrams illustrating some example feature sensors that may be used in various implementations of the X-ray scanning system 100 of FIG. 1.

Figures 2A, 2B, 2C, 2D:
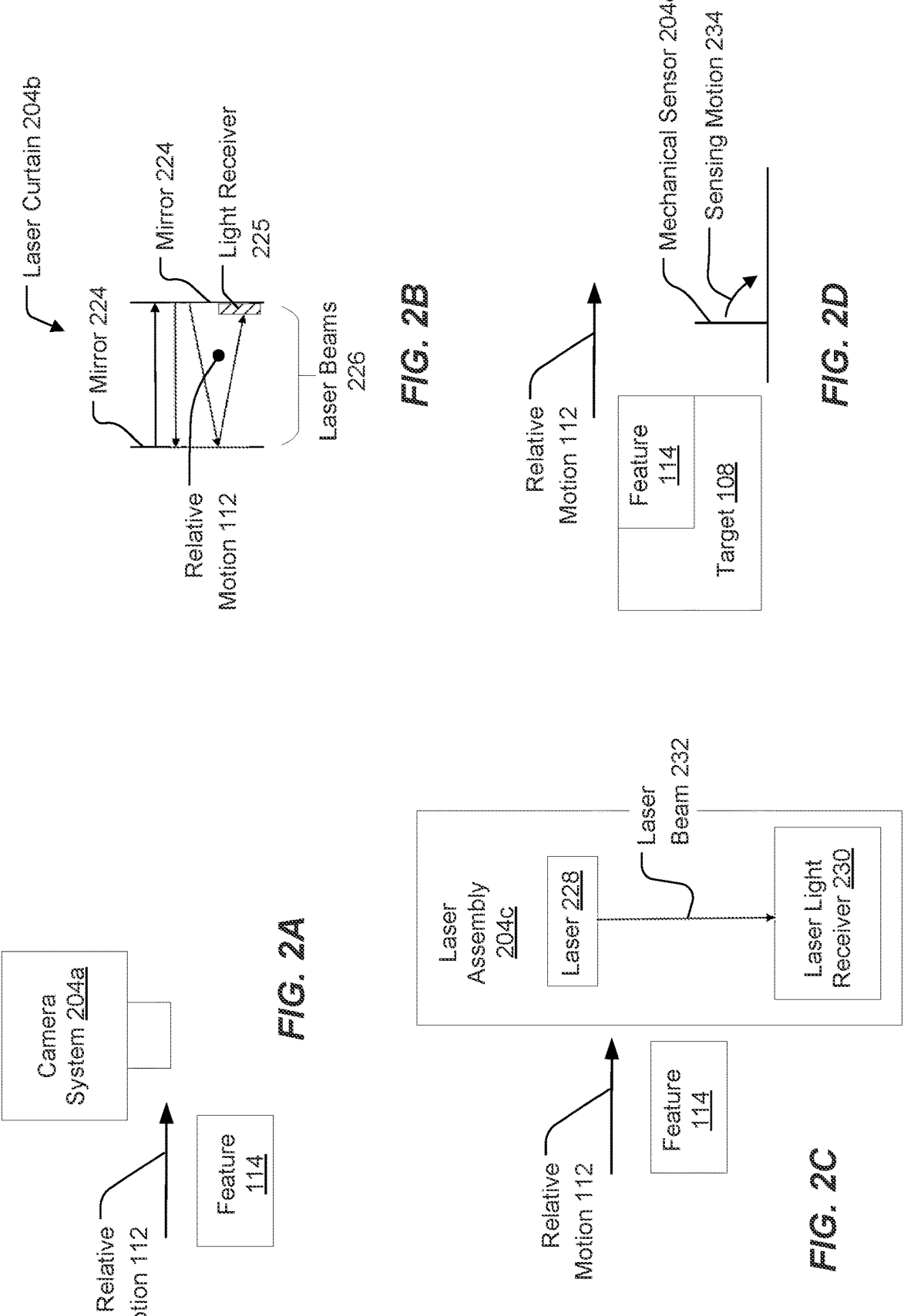
FIGS. 2A-2D are diagrams illustrating example feature sensors that may be used in various implementations of the X-ray scanning system of FIG. 1.

FIG. 2A is a schematic diagram illustrating a camera system 204a, which is an example of the feature sensor 204. As the relative motion 112 causes the feature 114 to enter a field of view of the camera system 204a, the camera system 204a may capture the feature 114 in a set of camera images. In one implementation, the camera system 204a detects the feature 114 of the target 108 using an image analysis technique. For example, the camera system 204a may acquire an image of the target 108 at visible or infrared wavelengths and may include a processor that performs analysis of the image. Alternatively, the camera system 204a may communicate image data to an image processor that can be optionally added to the X-ray scanning system 100 to perform analysis of the image to identity the feature 114. In this manner, the sensing action 116 can include the image acquisition and the image analysis. As part of performing the analysis, various known machine vision techniques may be used. Some examples are edge detection and more complex feature identification techniques using artificial intelligence (AI). An AI model executed in the processor can be trained to recognize various examples of the feature 114.

FIG. 2B is a schematic diagram illustrating an example light source/receiver system, namely a laser curtain 204b, which is an example of the feature sensor 104 of FIG. 1. The laser curtain 204b can include features such as mirrors 224 reflecting various laser beams 226. The laser curtain 204b may also include various light receivers 225 configured to receive laser light from the laser beams 226. Using the mirrors 224, laser beams 226, and any laser beam sensors that are incorporated, the laser curtain 204b can sense the feature 114 by means of the feature 114 interrupting one or more of the laser beams 226 in the course of the relative motion 112, which can be into or out of the page, as depicted by a dot in FIG. 2B. Other aspects and types of laser curtains are known in the art of detection of object features such as edges and will be understood by those of skill in the art to be within the scope of embodiments.

FIG. 2C is schematic block diagram illustrating another example light source/receiver system, namely a laser assembly 204c, which is another example of the feature sensor 104 of FIG. 1. The laser assembly 204c includes a laser 228 and a laser light receiver 230, which may be a photodiode, for example. As the relative motion 112 causes the feature 114 of the target 108 to intersect with a laser beam 232 output by the laser 228, the laser beam 232 is interrupted from being received at the laser light receiver 230. In this manner, the feature 114 may be known to be located at a position of the laser beam 232. Other types of laser assemblies that can be used in implementations of the feature sensor 104 are known in the art of laser-based sensing.

FIG. 2D is a schematic block diagram illustrating a mechanical sensor 204d, which is a further example of the feature sensor 104 of FIG. 1. Various types of mechanical sensors are known in the art of sensing of physical objects included in the scope of the target 108 and features thereof included in the scope of the feature 114. In essence, the mechanical sensor 204d may include a mechanical element, such as an electromechanical or optomechanical switch, that is designed to be triggered by a physical object, such as the target 108. For example, the feature 114 can be an end or edge of the target 108, which can trigger a sensing (mechanical) motion 234 of the mechanical sensor 204d. The sensing motion 234 may occur as the relative motion 112 causes the feature 114 to contact the mechanical sensor 204d physically.

In certain implementations of the X-ray scanning system 100, a combination of feature sensors is implemented, such as two or more of the example feature sensors of FIGS. 2A-2D. For example, the camera system 204a may be used to sense the feature 114, while the mechanical sensor 204d may be used either to sense the feature 114 to provide dual-sensor redundancy, or to sense another feature of the target 108, not shown in FIGS. 1-3D. Similarly, various feature sensors, including those shown in FIGS. 2A-2D, as well as others within the scope of embodiments, may be used for various functions. For example, in some implementations, two sensors are provided. One sensor is used to detect, first, the feature 114, and the blanking signal 120 of FIG. 1 is turned on to an ON state, such that accumulation of radiation data by the radiation detector 122 is paused responsive to the blanking signal 120. Thereafter, upon detection of the rear bumper 414b, the blanking signal 120 is turned to an OFF state, such that accumulation of radiation data by the radiation detector 122 resumes.

Figure 3:
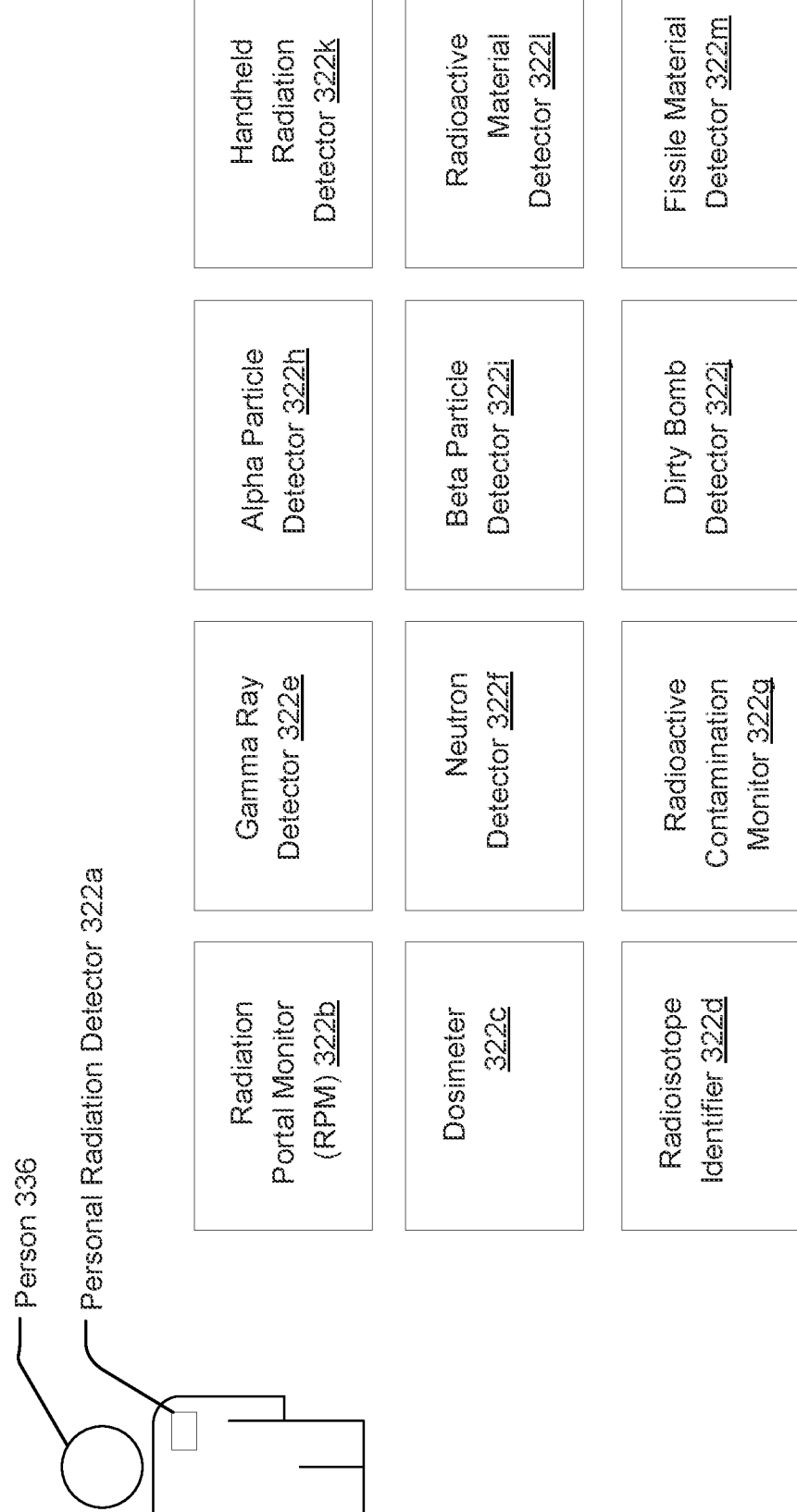
FIG. 3 is a schematic block diagram illustrating various examples of the radiation detector of FIG. 1.

FIG. 3 is a schematic block diagram illustrating various examples of the radiation detector 122 of FIG. 1. In one implementation, the radiation detector 122 is a personal radiation detector 322a that is intended to be worn by a person 336 to monitor and/or record personal radiation exposure of the person 336. In another implementation, the radiation detector 122 is a radiation portal monitor (RPM) 322b. RPMs may be used in vehicle portals that are intended both (i) to X-ray scan vehicles that pass therethrough and (ii) to detect radioactive materials that may be carried by the vehicles. The detection of radioactive materials can be implemented to prevent unauthorized transport of the radioactive materials, enhancing the protection provided by the X-ray scanning vehicle portal.

In yet other implementations, the radioactive detector 122 may include a dosimeter 322c, a radioisotope identifier 322d, a gamma ray detector 322e, a neutron detector 322f, a radioactive contamination monitor 322g, an alpha particle detector 322h, a beta particle detector 322i, a dirty bomb detector 322j, a handheld radiation detector 322k, a radioactive material detector 322l, a fissile material detector 322m, or a combination of two or more radiation detectors selected from the examples 322a-m.

Figure 4:
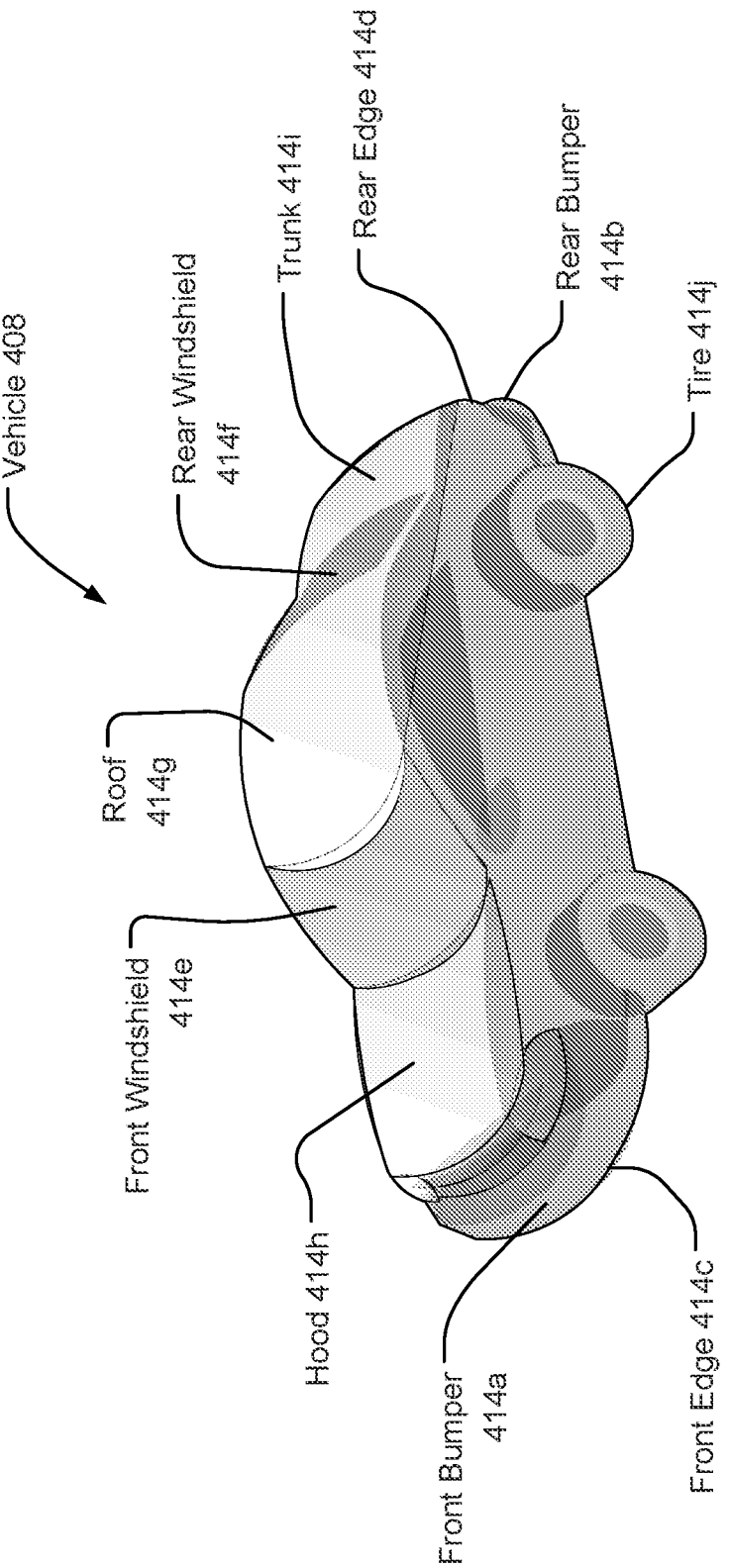
FIG. 4 is a perspective-view diagram of a vehicle, which is an example of the target for X-ray scanning illustrated in FIG. 1.

FIG. 4 is a perspective-view diagram of a vehicle 408, which is an example of the target 108 of FIG. 1. FIG. 4 also illustrates various specific examples of the feature 114 of FIG. 1. These examples include a front bumper 414a, a rear bumper 414b, a front edge 414c, a rear edge 414d, a front windshield 414c, a rear windshield 414f, a roof 414g, a hood 414h, a trunk 414i, and a tire 414j.

Various selections from these examples may be sensed by the feature sensor 104 of FIG. 1. In one example, the front bumper 414a of the vehicle 408 is sensed by the laser assembly 4404c of FIG. 2C. In another example, the roof 414g is sensed by the camera system 204a, wherein sensing includes identifying the roof 414g. In another example, the rear edge 414d is sensed by the laser curtain 204b by detecting when the laser beams 226 resume being received after the vehicle 408 passes through the laser curtain 204b. In yet another example, the tire 414j is sensed by the mechanical sensor 204d, which can be installed as a ground-based electromechanical switch. This sensing is done by the mechanical sensor 204d being activated when the tire 414j presses thereon. In still other implementations, a combination of different feature sensors from these examples are used, either to detect redundantly the same feature of a target, or to detect respective features of a target. In one implementation, two feature sensors 104 are used to detect, respectively, the front bumper 414a and the rear bumper 414b. Upon detection of the front bumper 414a, the blanking signal 120 of FIG. 1 is turned to an ON state, such that accumulation of radiation data by the radiation detector 122 is paused responsive to the blanking signal 120. Thereafter, upon detection of the rear bumper 414b, the blanking signal 120 is turned to an OFF state, such that accumulation of radiation data by the radiation detector 122 resumes.

Figure 5:
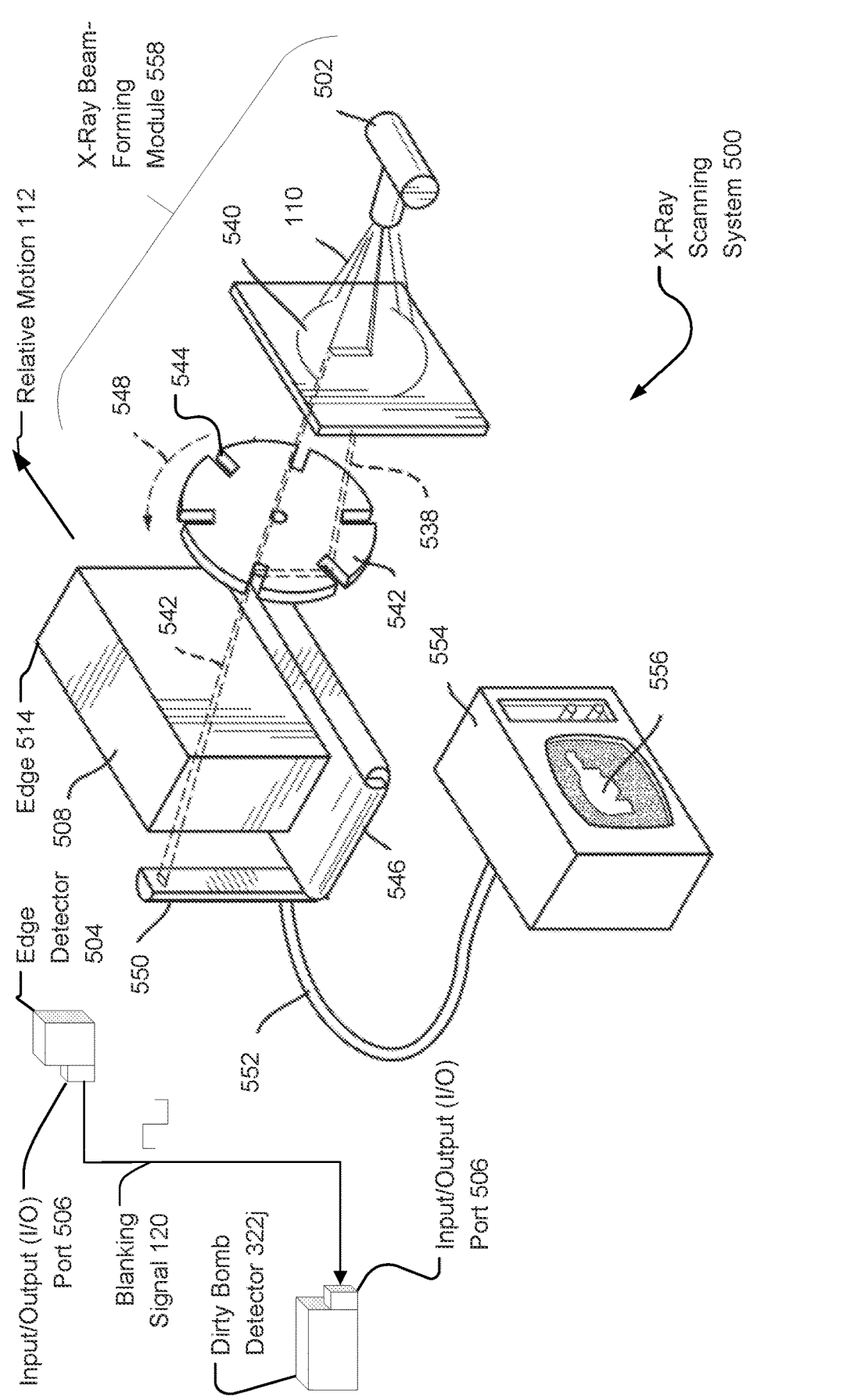
FIG. 5 is a perspective-view diagram illustrating an example implementation of the X-ray scanning system of FIG. 1, as a luggage scanning system.

FIG. 5 is a perspective-view diagram illustrating an example implementation of the X-ray scanning system 100 of FIG. 1. An X-ray scanning system 500 of FIG. 5 exemplifies some basic features of known backscatter imaging systems that output a scanning pencil beam 542 of the source X-rays 110. An X-ray source 502 in this embodiment is a standard X-ray tube, which generates the source X-rays 110. The source X-rays 110 are formed (here, collimated) into a stationary fan beam 538 by a collimation slit aperture in an attenuating plate 540. The stationary fan beam 539 can then be "chopped" into a scanning pencil beam 542 by a disk chopper wheel 542 that defines scanning slit apertures 544 (which may also be referred to herein as "slits") therein and rotates with a rotation 548. Together, the X-ray source 502, the attenuating plate 540, and the disk chopper wheel 542 form an X-ray beam-forming module 558. In alternative implementations, the source X-rays 110 are formed only into the stationary fan beam 538, which is used to scan over the target directly, without a need for the disk chopper wheel 542.

The scanning pencil beam 542 thus scans over an article of luggage 508 as the article of luggage 508 moves with the relative motion 112 between the article of luggage 508 and the X-ray source 508. The article of luggage 508 is an example of the target 108 of FIG. 1. The relative motion 112 in this implementation is provided by a conveyor 546, which includes a table and a conveyor belt that moves the article of luggage 508 with respect to the source 502.

The X-ray scanning system 500 can perform transmission X-ray imaging using a transmission X-ray detector 550. X-rays of the scanning pencil beam 542 that interact with the article of luggage 508 (in this case by being transmitted through the article of luggage 508) are detected by the transmission X-ray detector 550. The transmission X-ray detector 550 outputs a detector signal to a monitor 554 via a detector signal cable 552, and the monitor 554 shows a transmission X-ray image 556 of contents of the article of luggage 508.

The X-ray scanning system 500 can also perform backscatter X-ray imaging using a set of backscatter imaging X-ray detectors (not shown in FIG. 5). The backscatter imaging X-ray detectors may be positioned to detect resultant X-rays that result from the scanning pencil beam 542 interacting with the article of luggage 508 and are scattered by the article of luggage 508 in a general or specific backward direction, such as in a vicinity between the article of luggage 508 and the disk chopper wheel 542. An intensity of the resultant X-rays scattered in the backwards direction may be thus recorded by the set of more backscatter X-ray backscatter detectors (not shown in FIG. 5) as a function of position of the irradiating, scanning pencil beam 542. In the case of backscatter X-ray imaging, it can be advantageous for the backscatter X-ray detectors to be large-area detectors in order to detect the greatest number of X-rays scattered in various specific backward directions. By moving the article of luggage 508 through a scan plane of the pencil scanning beam 542, either on the conveyor 546 or under its own power, a two-dimensional backscatter image of the article of luggage 508 may be obtained.

The X-ray scanning system 500 further includes an edge detector 504, which is an example of the feature sensor 104 of FIG. 1, and the dirty bomb detector 322j. The edge detector 504 can comprise any one, or a combination of two or more, of the example feature sensors of FIGS. 2A-2D. The edge detector 504 is configured to locate an edge 514 of the article of luggage 508 before the edge 514 passes through the scanning pencil beam 542. Since the article of luggage 508, and especially the edge 514, may cause scattering of resultant X-rays that may interfere with operation of the dirty bomb detector 322j, it is useful to cause the dirty bomb detector 322j to pause an accumulation of radiation detection data. In order to do this, the edge detector 504 is configured to sense the edge 514 and to use an input/output (I/O) port 506 integrated with the edge detector 504 to send the blanking signal 120 to the dirty bomb detector 322j. The I/O port 506 is an example of the communication interface 106 of FIG. 1. The dirty bomb detector 322j receives the blanking signal 322j via its own integrated I/O port 506 and, responsively, pauses accumulation of the radiation detection data. In some implementations, the edge detector 504 may further sense a trailing edge of the article of luggage 508 and respond by sending a further signal to the dirty bomb detector 322j to resume accumulation of radiation detection data.

Figures 6A, 6B, 6C:
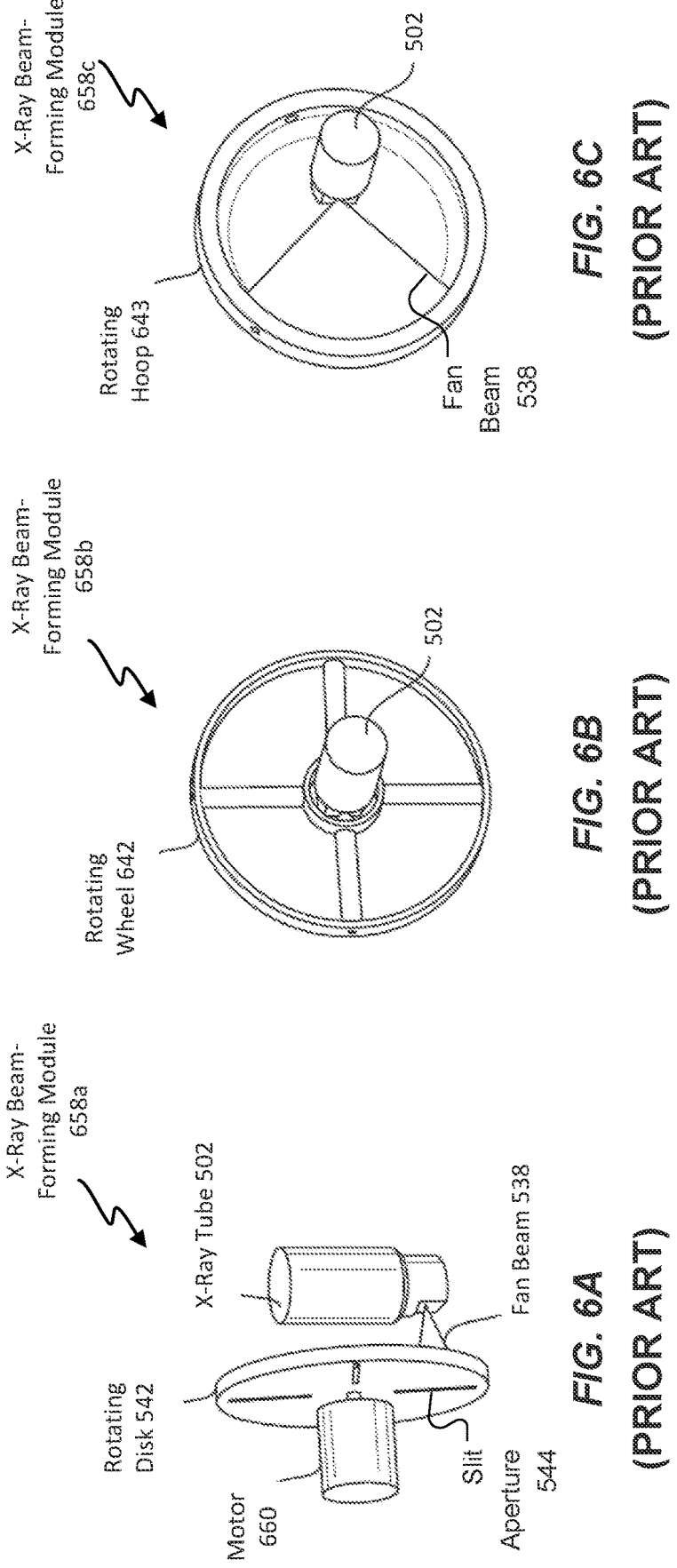
FIGS. 6A-6C (prior art) illustrate three different types of existing X-ray beam-forming modules that may be used as part of embodiments to generate scanning pencil beams.

FIGS. 6A-6C (prior art) illustrate three different types of existing X-ray beam forming modules that can be used in various implementations of the X-ray scanning system 100 of FIG. 1 for generating scanning pencil beams of source X-rays by implementing respective types of chopper wheels. The scanning pencil beams may be generated from a substantially stationary, wide x-ray beam of source X-rays emanating either directly from the X-ray tube 502 or also through an intermediary collimation plate, which may also be referred to herein as an "attenuation plate." Collimation plates are not shown in FIGS. 6A-6C, but the attenuation plate 540 of FIG. 5 is an example. The chopper wheel of existing x-ray backscatter imaging systems is usually one of three basic types: the rotating disk chopper wheel 542 (which may also referred to herein as a "disk" or "disk chopper wheel"), a rotating wheel chopper wheel 642 (which may also be referred to herein as a "hub-and-spoke" chopper wheel), or a rotating hoop chopper wheel 643 (which may also be referred to herein as a "hoop" chopper wheel). The three types are shown in FIGS. 6A, 6B, 6C, respectively, in x-ray beam-forming modules 658a, 658b, 658c, respectively. The chopper wheels 542, 642, and 643 can be rotatably mounted in various ways that are known in the art of x-ray scanning. FIG. 6A illustrates one way of causing a chopper wheel to rotate, wherein the disk chopper wheel 542 is coupled to a shaft of a motor 660. Slit apertures 544 defined within the disk chopper wheel 542 serve a purpose similar to that of the slit apertures 544 of FIG. 5.

Figure 7:
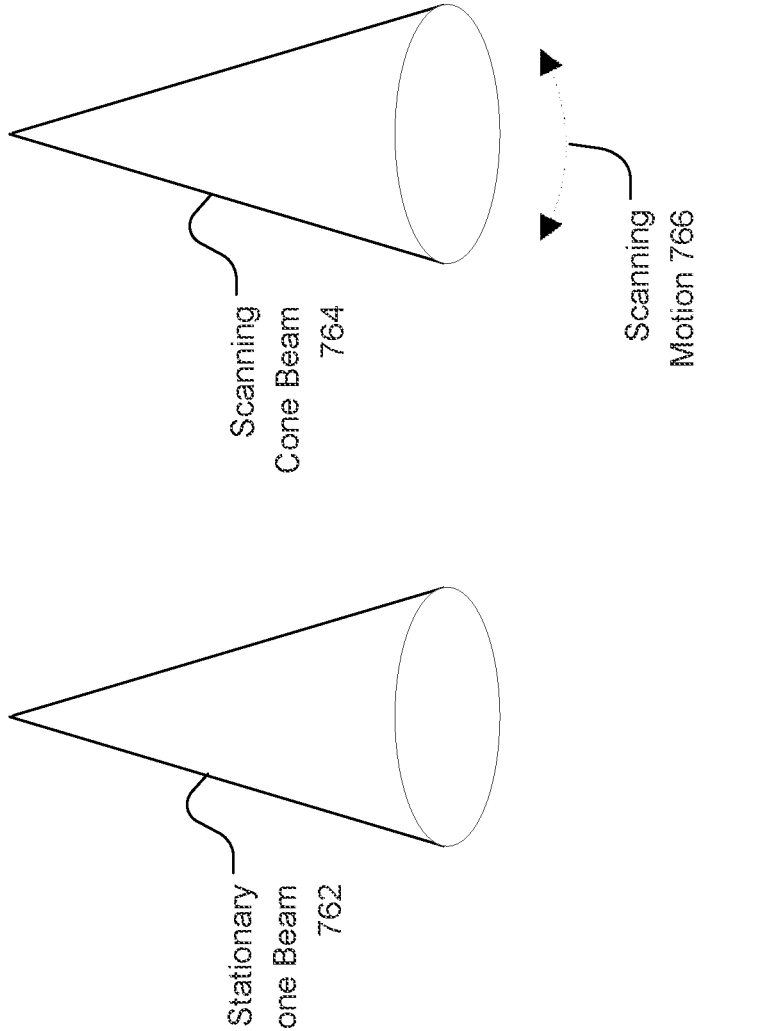
FIG. 7 is a schematic diagram illustrating alternative, cone-shaped X-ray beams into which the source X-rays of embodiments may be formed for irradiation of a target.

FIG. 7 is a schematic diagram illustrating alternative, cone-shaped X-ray beams into which the source X-rays 110 may be formed for irradiation of the target 108 of FIG. 1. On the left of FIG. 7, a stationary cone beam 762 is shown, which remains fixed in space with respect to the X-ray source 102 of FIG. 1, much like the source X-rays 110 and stationary fan beam 538 of FIG. 5. Alternatively, the right side of FIG. 7 shows a scanning cone beam 764, which may scan over the target 108 with a scanning motion 762, such that the cone beam does not remain fixed in space with respect to the X-ray source 102.

FIG. 8 (prior art) further illustrates a problem encountered in existing vehicle portal systems that may be solved by embodiments the present embodiments. Specifically, FIG. 8 includes a top view and a side view of an X-ray scanning system 800 that includes an undercarriage X-ray beamforming module 858. The source X-rays are output from the X-ray source 102, which forms a part of the X-ray beam-forming module 858, which also forms the source X-rays into a scanning pencil beam that exits the enclosure 870 in a nominally vertical direction. In alternative embodiments, the X-ray beam-forming module 858 may be configured to create a fan beam of scanning X-rays that exits from the enclosure nominally centered with respect to the vertical direction.

As the vehicle 408 proceeds through the portal, along a road surface 872 and in a direction of travel 868, the vehicle 408 passes through the source X-rays 110. In the course of the passage through the source X-rays 110, resultant X-rays 878 that result from interaction of the source X-rays with the vehicle 408 (specifically, in this example, scattered X-rays) include backscattered X-rays that are detected by backscatter imaging X-ray detectors 878 that are placed just under the road surface 872. Detector signals from the backscatter imaging X-ray detectors 878 can be used for X-ray imaging the vehicle 408.

Some of the resultant X-rays 878 may be scattered in other directions other than toward the backscatter imaging X-ray detectors 876, including toward the RPM 322*b* included in the X-ray scanning system 800. These resultant X-rays 878 can interfere with operation of the radiation of the RPM 322*b*, causing spurious detection of radiation that does not result from any radioactive materials in the vehicle 408. This can happen especially since the X-ray sources used in typical backscatter X-ray scanning arrangements are in continuous operation throughout a passage of the vehicle through the portal system. Previous attempts to eliminate such spurious detection have included positioning the RPM 322*b* at a distance 874 from the source X-rays 110 along a direction parallel to the direction of travel 868. A technical challenge is that the distance 874 required to eliminate the spurious radiation detection signals is not available or convenient to implement in many vehicle portal systems. Another fraction of the resultant X-rays will pass (be transmitted) through the vehicle and be measured in a transmission detector array that surrounds the vehicle in a U-shape above the ground (not illustrated in FIG. 8). These transmission X-rays can be further blocked by steel or lead scatter shields and beam stops that surround the transmission detector (the transmission detector, beam stops, and scatter shields are not displayed in the figures but are known in the art).

At a time before the vehicle 408 intersects with the source X-rays 110, as illustrated in FIG. 8, there may be little or no resultant X-rays 878 that are scattered in a direction of the RPM 322*b*. However, intersection of the vehicle 408 with the source X-rays 110 in the course of later stages of the vehicle's travel through the portal may result in the spurious detection. Furthermore, other directions of incidence of source X-rays on the vehicle from other X-ray scanning modules (not shown in FIG. 8) may be provided in portal systems, and source X-rays from various directions may be prone to scatter strongly from a front windshield of the vehicle, a rear windshield of the vehicle, a curvature of a roof of the vehicle, a curvature of a hood or trunk of the vehicle, or a front or rear bumper of the vehicle, for example.

Figures 9, 10:
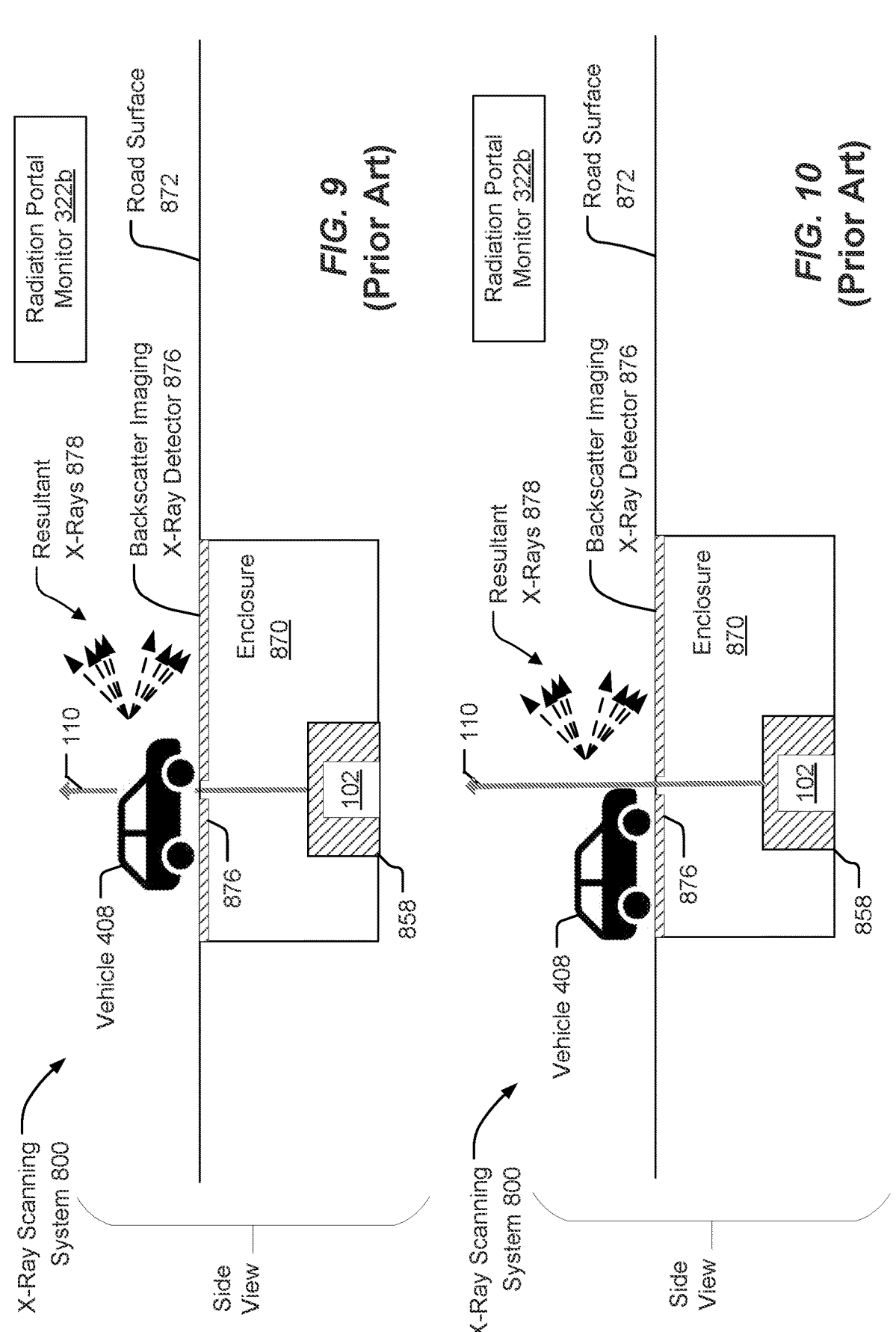
FIG. 9 (prior art) is a side-view illustration of the X-ray scanning system of FIG. 8 at a later stage of the vehicle passing over the source X-rays.
FIG. 10 (prior art) is a further side-view illustration of the X-ray scanning system 800 at a stage that is intermediate between the stages of FIG. 8 and FIG. 9, when the vehicle is just beginning to intersect the source X-rays.

FIG. 9 (prior art) is a side-view illustration of the X-ray scanning system 800 of FIG. 8 at a later stage, when the vehicle 408 is passing over the source X-rays 110. In this position, the vehicle 408 may substantially shield resultant X-rays 878 that may otherwise be scattered toward the RPM 322*b*.

FIG. 10 (prior art) is a further side-view illustration of the X-ray scanning system 800 at a stage that is intermediate between the stages of FIG. 8 and FIG. 9, when the vehicle 408 is just beginning to intersect the source X-rays 110. At this position, more resultant X-rays 878 may be scattered toward the RPM 322*b*, resulting in more spurious radiation detection signals. Resultant X-rays may be particularly scattered by components of the vehicle 408 such as the bumper to cause this issue. Furthermore, in portal systems with other X-ray scanning modules, such as an overhead vehicle backscatter X-ray scanning module or a side-view vehicle backscatter X-ray scanning module, resultant X-rays that are scatter from the windshield, hood, roof, and other example features of the vehicle 408 such as those illustrated in FIG. 4 may result in increased spurious radiation detection.

FIG. 11 is a diagram of an example X-ray scanning system 1100 in the form of a vehicle portal. The X-ray scanning system 1100 is an example implementation of the X-ray scanning system 100 of FIG. 1. The X-ray scanning system 1100 includes many of the components of the existing portals vehicle portals illustrated in FIGS. 8-10, as will be understood in cases of like numbering of features of the figures. However, the X-ray scanning system 1100 additionally includes a feature sensor 104 that is configured to sense a feature of the vehicle 408. The feature sensor 104 can include any one of the examples illustrated in FIGS. 2A-2D, in addition to other examples that will be understood to be within the scope of embodiments based on knowledge of those skilled in the art.

In various specific implementations, the feature sensor 104 can be configured to sense any features of the vehicle 408, some of which are illustrated in the examples shown in FIG. 4. However, in the specific implementation of FIG. 11, the feature sensor 104 is configured to detect the front edge 414*c* of the vehicle 408, just before the vehicle 408 intersects with the source X-rays 110. Once the feature is sensed, the feature sensor 104, which is operatively coupled to the communication interface 106, causes the communication interface 106 to output the blanking signal 120. The blanking signal 120 is received at the RPM 322*b*, which pauses collection of radiation data responsive to the blanking signal 120. In this implementation, the blanking signal 120 is a wired electronic blanking signal. In other implementations, the blanking signal 120 can be an optical wired signal.

Figure 12:
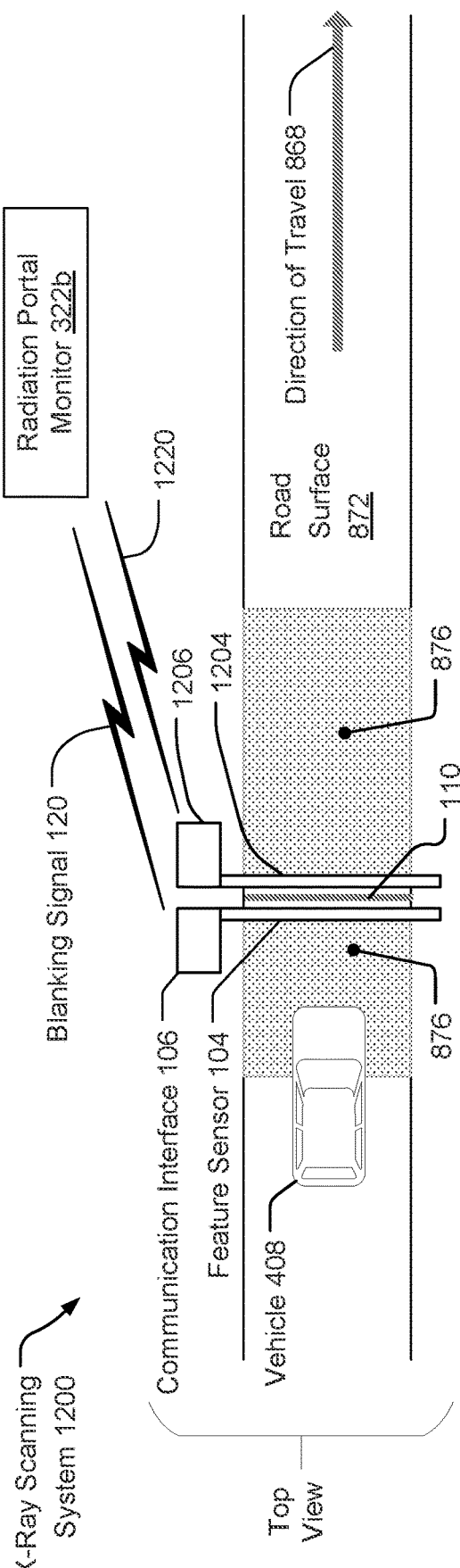
FIG. 12 is a top-view illustration of an X-ray scanning system similar to that of FIG. 11, but incorporating dual feature sensors and wireless communications to a radiation portal monitor (RPM).

FIG. 12 is a top-view illustration of an X-ray scanning system 1200 that is similar to that of FIG. 11 but incorporates dual feature sensors and wireless communications to the RPM. As in the X-ray scanning system 1100 of FIG. 11, the feature sensor 104 is configured to identify the front edge 414*c* of the vehicle 408 and to cause the communication interface 106 to output the blanking signal 120 to the RPM 322*b*. In this implementation, the blanking signal 120 is a wireless signal, particularly a radio frequency signal. In other implementations, the wireless signal can be a free-space optical signal.

The X-ray scanning system 1200 further includes a second feature sensor 1204, operatively coupled to a second communication interface 1206. In this implementation, the feature sensor 104 may be referred to as "a first feature sensor." The second feature sensor 1204 is configured to detect the rear edge 414*d* of the vehicle 408, indicating that the vehicle's 408 has completely passed out of the source X-rays 110. Responsively, the feature sensor 1204 causes the communication interface 1206 to output a second wireless signal 1220 to the RPM 322*b*. The second wireless signal 1220 results in the RPM 322*b* resuming accumulation of radiation detection data.

The second wireless signal 1220 may also be considered a "blanking signal," as used herein, with the blanking signal in an OFF state. In other implementations, the single communication interface 106 may suffice, with the feature sensors 104 and 1204 both operatively coupled to the communication interface 106. The communication interface 106 may be configured to output the blanking signal 120 in either the ON state or the OFF state. Furthermore, in other implementations, a single feature sensor, such as the camera system 204*a* of FIG. 2A, may be configured to sense both the front edge 414*c* and the rear edge 414*d* of the vehicle 408.

Figure 13:
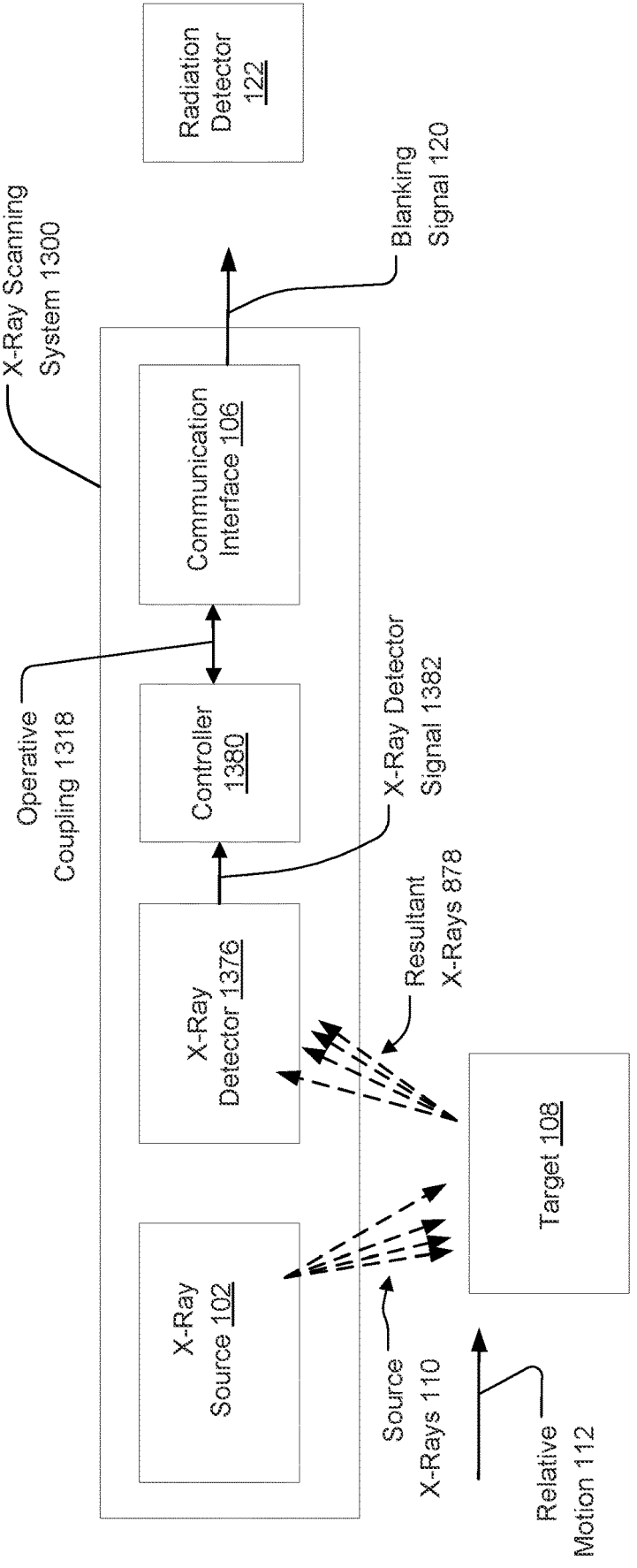
FIG. 13 is a schematic block diagram illustrating an X-ray scanning system according to an embodiment that does not rely on a separate feature sensor, but instead utilizes an X-ray detector signal to determine when resultant X-rays may interfere with a radiation detector.

FIG. 13 is a schematic block diagram illustrating an X-ray scanning system 1300 according to an embodiment. The X-ray scanning system 1300 relies on X-ray detector signals, rather than a feature sensor as in FIG. 1, to control whether a blanking signal is sent. The X-ray scanning system 1300 includes the X-ray source 102 and the communication interface 106 of FIG. 1, as well as an X-ray detector 1376 and a controller 1380. The X-ray source 102 is configured to irradiate the target 108 with the source X-rays 110 in the course of the relative motion 112 between the X-ray source 102 and the target 108. The X-ray detector 1376 is configured to detect the resultant X-rays 878 that result from interaction of the source X-rays 110 with the target 108 in the course of the relative motion 112. The X-ray detector 1376 outputs an X-ray detector signal 1382 indicating a rate of detection of the resultant X-rays 878. The controller 1380 is configured to receive the X-ray detector signal 1382 and to determine whether the rate of detection exceeds a threshold. The communication interface 106 is operatively coupled to the controller 1380, as indicated by an operative coupling 1318. The communication interface 106 is configured to output the blanking signal 120 responsive to the rate of detection exceeding the threshold.

In various implementations of the X-ray scanning system 1300, the X-ray detector 1376 can be a backscatter imaging X-ray detector, a transmission imaging X-ray detector, or an auxiliary scattering X-ray detector. As used herein, an "auxiliary scattering X-ray detector" is an X-ray detector that is configured to detect resultant X-rays that are scattered, whose output X-ray detector signal is not used for X-ray imaging. Instead, the X-ray detector signal output from the auxiliary scattering X-ray detector is used only to determine whether there is excessive X-ray scattering that may interfere with operation of a radiation detector.

The various options for the X-ray source 102, the source X-rays 110, the target 108, the relative motion 112, the resultant X-rays 878, the X-ray detector 1376, the operative coupling 1318, the communication interface 106, the blanking signal 120, and the radiation detector 122 (not part of the X-ray scanning system 1300) that are described in relation to FIGS. 1-14 may optionally apply to the X-ray scanning system 1300, unless the context indicates otherwise. For example, various X-ray beam forming modules and forms of the source X-rays 110 may be used, and specific implementations of the X-ray scanning system 1300 can include a vehicle scanning portal, a luggage scanning system, and other systems that may be used to provide X-ray scanning of packages, other objects, people, and combinations thereof.

Figure 14:
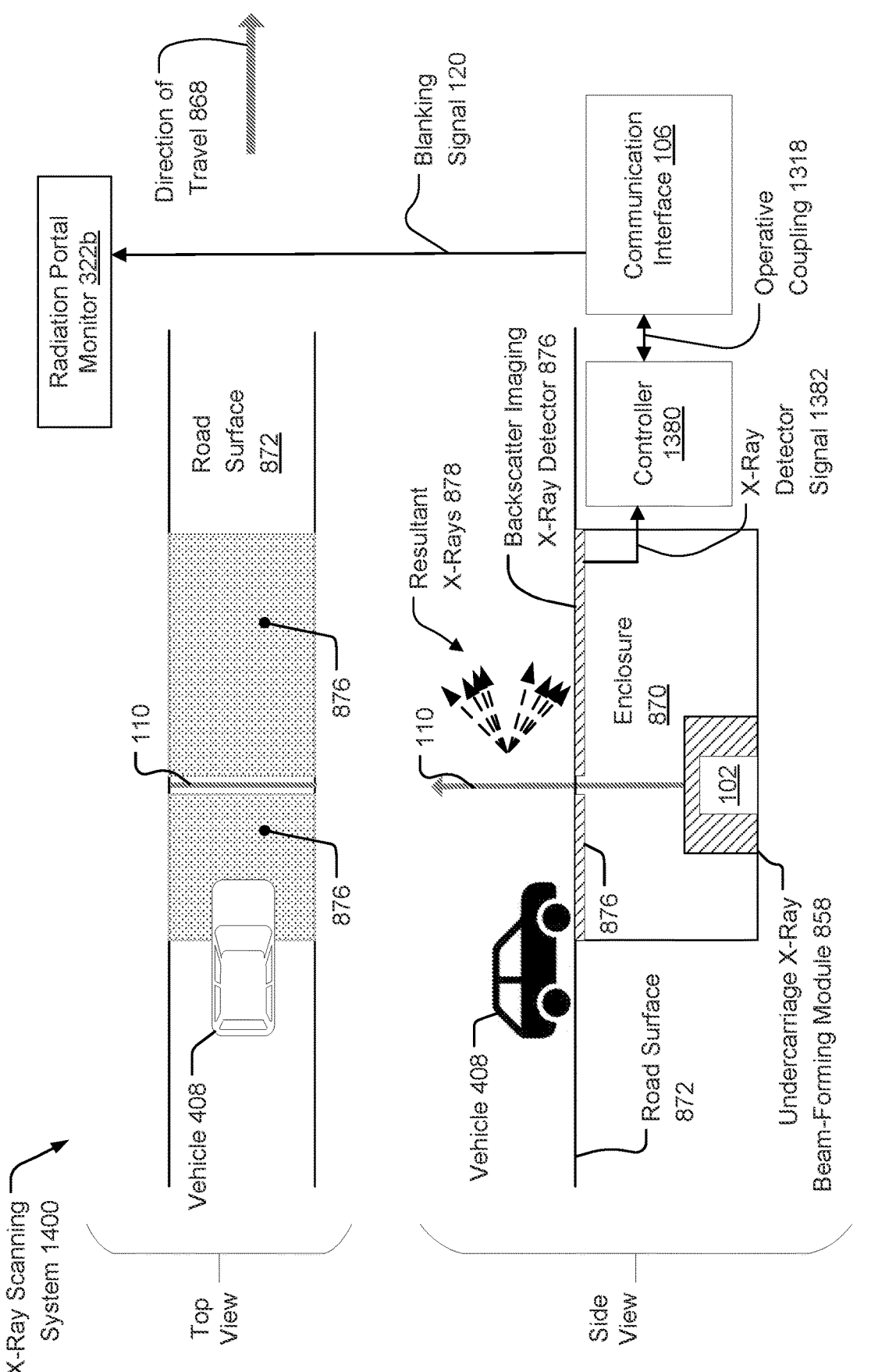
FIG. 14 includes top-view and side-view diagrams of an X-ray scanning system, implemented as a vehicle portal and consistent with the embodiment of FIG. 13.

FIG. 14 includes top-view and side-view diagrams of an X-ray scanning system 1400, which is an implementation of the embodiment of FIG. 13. The X-ray scanning system 1400 is in a form of a vehicle portal that includes many of the elements shown in FIGS. 11-12. However, the X-ray scanning system 1400 does not require a feature sensor, as implemented in FIGS. 11-12. Instead, signal output from the backscatter imaging X-ray detectors 876 (which are an example of the X-ray detector 1376 illustrated in FIG. 13) is used to determine whether the blanking signal 120 should be output, or set to the ON state. As the backscatter imaging X-ray detectors 876 receive the resultant X-rays 878, they output an X-ray detector signal 1382 to a controller 1380. The controller 1380 receives the X-ray detector signal 1382 and determines whether a rate of detection indicated by the X-ray detector signal 1382 exceeds a given threshold.

The threshold rate of detection may be stored in a memory of the controller 1380, accessible to a processor of the controller 1380, for example. The controller 1380 is operatively coupled to the communication interface 106 and causes the communication interface 106 to output the blanking signal 120, or to set the blanking signal 122 the ON state, responsive to the rate of detection exceeding the threshold. The blanking signal 120 is received at the RPM 322*b*, and, when set to the ON state, results in the RPM 322*b* pausing accumulation of radiation detector data. The controller 1380 may be an analog comparator circuit configured to compare X-ray detector signal 1382 with a reference signal. Alternatively or additionally, the controller 1380 may include an analog-to-digital (A/D) converter that converts the X-ray detector signal 1382 to a digital signal, and a processor that digitally compares the digital signal to a the predetermined threshold value. The controller may be integrated with the X-ray detector 1376, may be a separate, dedicated controller (e.g., a computer or analog or digital signal processor), or a controller that performs other functions related to the X-ray scanning of the X-ray scanning system 1400 and additionally performs the signal comparison function.

Figure 15:
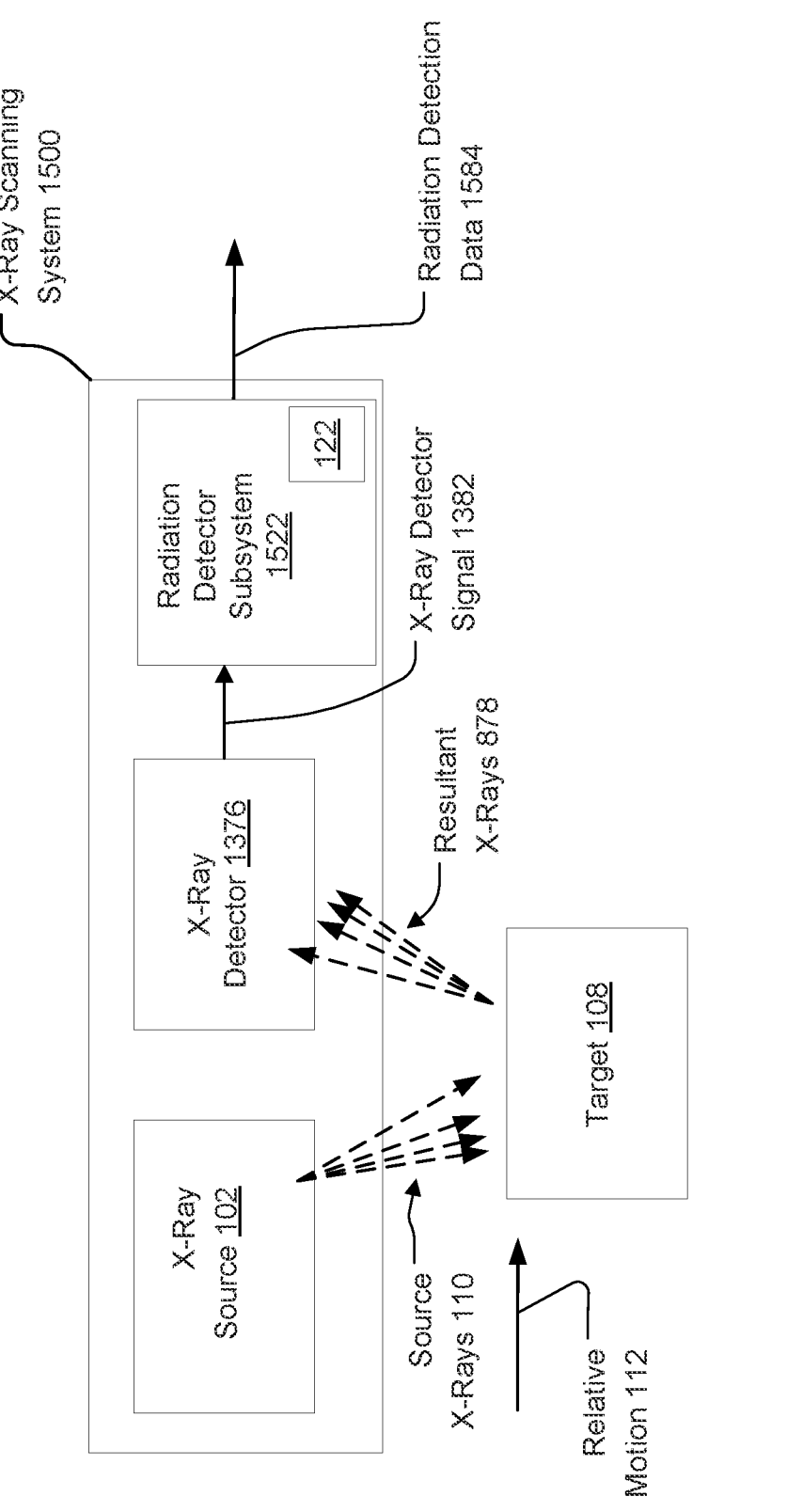
FIG. 15 is a schematic block diagram illustrating an X-ray scanning system according to an embodiment that does not rely upon a feature sensor, but instead communicates a signal from an X-ray detectors to a radiation detector.

FIG. 15 is a schematic block diagram illustrating an X-ray scanning system 1500, according to an embodiment. The X-ray scanning system 1500 relies upon a radiation detector subsystem 1522, rather than a blanking signal, as in the embodiment of FIG. 13.

The X-ray scanning system 1500 includes the X-ray source 102, the X-ray detector 1376, and the radiation detector subsystem 1522, which includes the radiation detector 122. The X-ray source 102 is configured to irradiate the target 108 with the source X-rays 110 in the course of the relative motion 112 between the X-ray source 102 and the target 108. The X-ray detector 1376, as in the embodiment of FIG. 13, is configured to output the X-ray detector signal 1382, which indicates the rate of detection of the resultant X-rays 878. However, in contrast to FIG. 13, the X-ray detector signal 1382 of FIG. 15 is routed to the radiation detector subsystem 1522, where logical decisions based upon the X-ray detector signal 1382 are made. The radiation detector subsystem 1522 is configured to receive the X-ray detector signal 1382 and to generate radiation detection data 1584 that are dependent upon the rate of detection.

The radiation detector subsystem 1522 may optionally include an A/D converter, a digital comparator, a computer, a processor, a memory, etc., as will be understood by those of skill in the art of radiation detectors, in order to perform the described functions in various specific implementations. As described in connection with FIGS. 13-14, the X-ray detector signal 1382 may be analog or digital, and functions of the radiation detector subsystem 1522 may be provided consistently, as will be understood by those of ordinary skill in the art of signal processing.

The radiation detector subsystem 1522 may act upon the X-ray detector signal 1382, when it exceeds a threshold value, by pausing accumulation of radiation detection data that would otherwise be accumulated by the radiation detector subsystem 1522. The radiation detector subsystem 1522 may be further configured to generate the radiation detection data 1584 by subtracting a background related to the X-ray detector signal.

The various options for the X-ray source 102, the source X-rays 110, the target 108, the relative motion 112, the resultant X-rays 878, the X-ray detector 1376, and the radiation detector 122 that are described in relation to FIGS. 1-14 may optionally apply to the X-ray scanning system 1500, unless the context indicates otherwise. For example, various X-ray beam forming modules and forms of the source X-rays 110 may be used, and specific implementations of the X-ray scanning system 1500 can include a vehicle scanning portal, a luggage scanning system, and other systems that may be used to provide X-ray scanning of packages, other objects, people, and combinations thereof.

Figure 16:
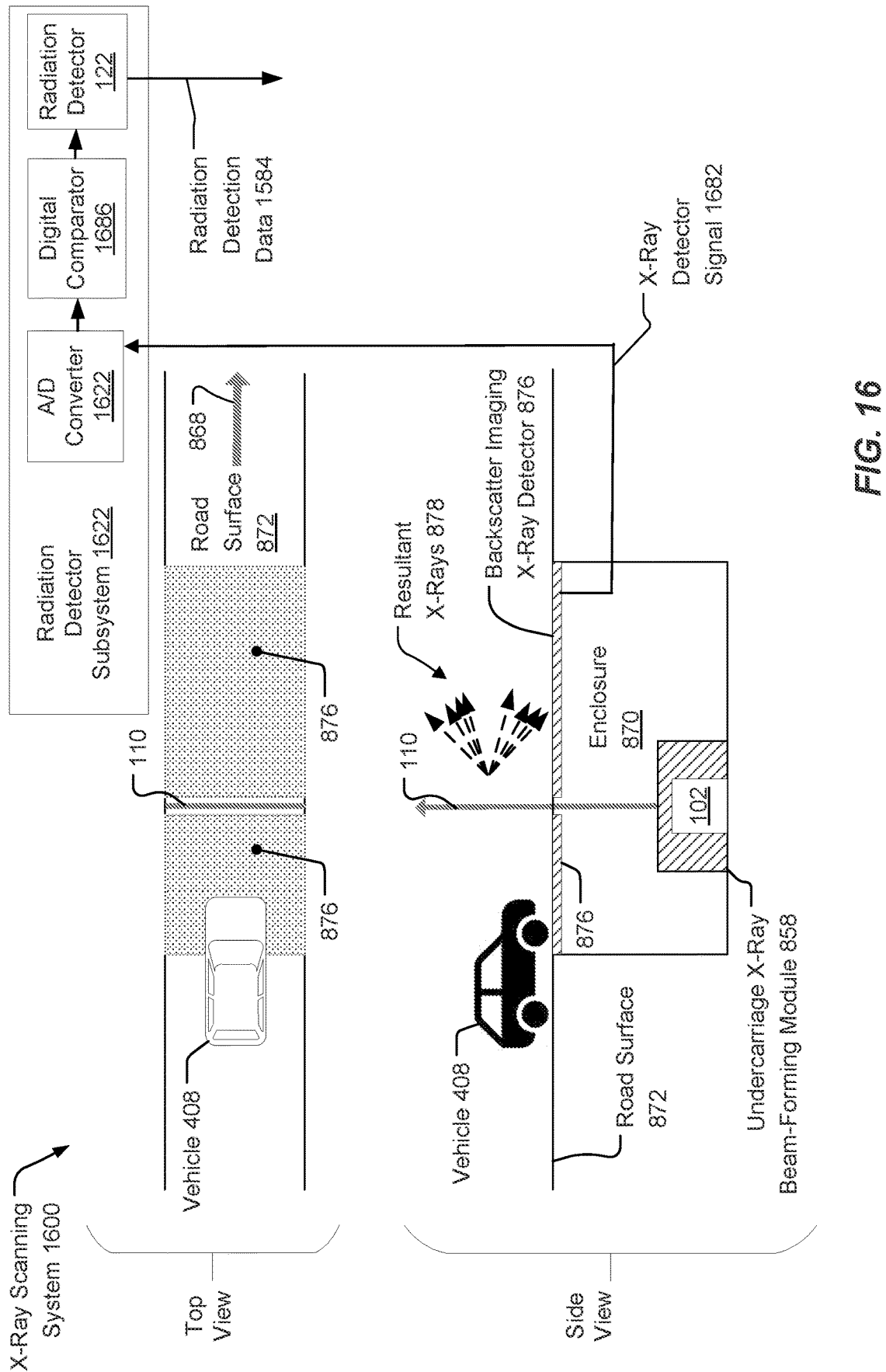
FIG. 16 is a diagram including a top view and a side view of an X-ray scanning system, illustrating an example implementation of the embodiment of FIG. 15 as a vehicle portal.

FIG. 16 is a diagram including a top view and a side view of an X-ray scanning system 1600. The X-ray scanning system 1600 is an example implementation of the embodiment of FIG. 15, specifically in a form of a vehicle portal. The X-ray scanning system 1600 includes various vehicle portal elements as shown in FIGS. 11-12 and 14, but also has certain differences from those figures. Namely, the X-ray scanning system 1600, like the implementation of FIG. 14, does not require a feature sensor, but instead utilizes an X-ray detector signal 1682 output from the backscatter imaging X-ray detectors 876. The X-ray detector signal 1682, which is analog in this implementation, is routed to the radiation detector subsystem 1622.

The radiation detector subsystem 1622 includes an A/D converter 1622, a digital comparator 1686, and the radiation detector 122. The A/D converter 1622 converts the X-ray detector signal 1682 to a digital X-ray detector signal. The A/D converter 1622 outputs the digital X-ray detector signal, which is received at the digital comparator 1686. The digital comparator 1686 compares the digitized X-ray detector signal to a predetermined threshold signal value and outputs the result to the radiation detector 122. The radiation detector 122 then outputs the radiation detection data 1584 dependent upon whether the rate of detection indicated by the digitized X-ray detector signal is greater than the threshold value. The radiation detector subsystem 1622, similar to the description of the radiation detector subsystem 1522 of FIG. 15, may cease to accumulate the radiation detector data 1584 if the X-ray detector signal exceeds the threshold. Ceasing to accumulate the data may be performed by the radiation detector 122.

Figure 17:
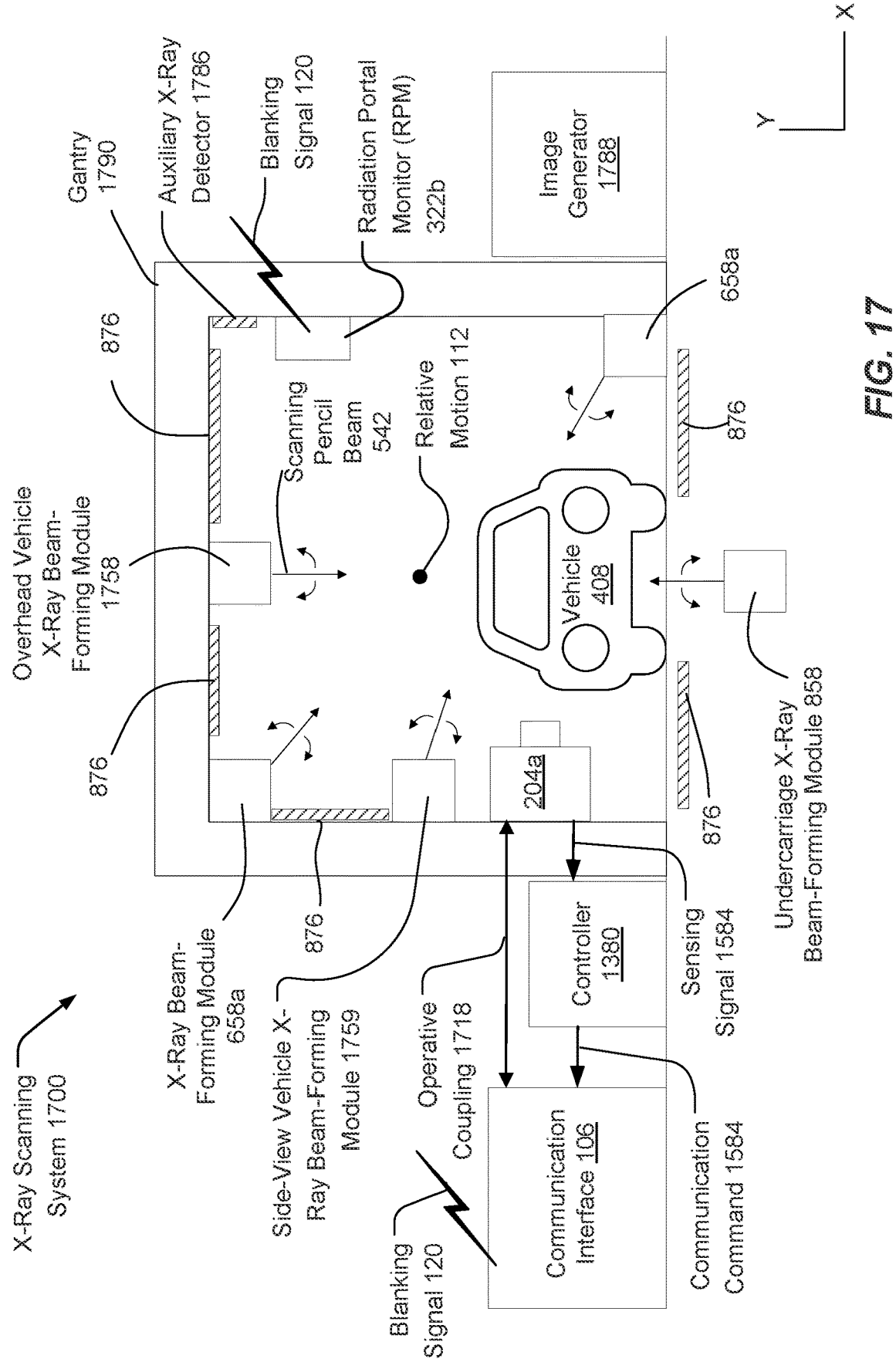
FIG. 17 is a cross-sectional diagram illustrating a specific implementation of the X-ray scanning system of FIG. 1 as a vehicle portal, as well as system elements that may be implemented in the system consistent with the embodiment of FIG. 15.

FIG. 17 is a cross-sectional diagram illustrating an X-ray scanning system 1700, in the form of a vehicle portal. The X-ray scanning system 1700 is a further specific implementation example of the X-ray scanning system 100 of FIG. 1. The vehicle 408 passes through the X-ray vehicle scanning portal formed in part by a gantry 1790. Various X-ray beam-forming modules 658a positioned around the gantry 1790 output source X-rays in the form of scanning pencil beams 542, which are used to provide backscatter X-ray imaging of the vehicle 408. In addition, the X-ray scanning system 1700 includes the undercarriage X-ray beam-forming module 858 and an overhead vehicle X-ray beam-forming module 1758, both of which further provide scanning pencil beams 542 that can be used for X-ray backscatter imaging. A side-view vehicle X-ray beam-forming module 1759 is also included, is configured to output sources x-rays in the form of a scanning pencil beam, and may have an internal structure similar to that of the X-ray beam-forming modules 658a. Various backscatter imaging X-ray detectors 876 positioned around the gantry 1790 are used to capture resultant X-rays (not shown in FIG. 17) that result from the scanning pencil beams 542 interacting with the vehicle 408. The vehicle 408 passes through the gantry 1790 with the relative motion 112, which in this view is out of the page, perpendicular to the X and Y axes that are shown.

The X-ray scanning system 1700 further includes an image generator 1788 that receives detector signals from the backscatter imaging X-ray detectors 876 and forms X-ray backscatter images of the vehicle 408. All of the scanning pencil beams 542 can also be used for transmission X-ray imaging with appropriately placed transmission X-ray detectors, as is known in the art of X-ray imaging, similar to the transmission X-ray detector 550 and transmission X-ray imaging function depicted in FIG. 5 using the scanning pencil beam 542.

The X-ray scanning system 1700 further includes the camera system 204a, which is used to detect features of the vehicle 408 in order to determine when the vehicle 408 is about to intersect with the scanning pencil beams 542. A controller 1380 receives a sensing signal 1584 from the camera system 204a. In a specific example, the sensing signal 1584 may include raw camera images from the camera system 204a, and the controller 1380 may analyze the images in order to complete sensing of the feature(s) of the vehicle 408. In another specific example, an image analysis capability is provided in the camera system 204a, and the sensing signal 1584 is simply an ON/OFF indication of whether a particular feature of the vehicle 408 is detected.

The controller 1380, based on the sensed feature, sends a communication command 1584 to the communication interface 106, causing the communication interface 106 to output the blanking signal 120. The blanking signal 120 in this implementation is wireless and is received at the RPM 322b at an opposite side of the gantry 1790. Accordingly, in this implementation, the feature sensor (camera system 204a) is operatively coupled to the communication interface 106 indirectly, through the controller 1380, as indicated by an operative coupling 1718.

Also illustrated in FIG. 17 is an auxiliary X-ray detector 1786 attached to the gantry 1790 near the RPM 322b. In an alternative implementation consistent with the embodiment of FIG. 15, the camera system 204a, controller 1380, and communication interface 106 are not required. Instead, the auxiliary X-ray detector 1786 is used solely to detect X-rays scattered from features of the vehicle 408, not for X-ray imaging, and its X-ray detector signal (not shown in FIG. 17) is output to the auxiliary X-ray detector 1786. When X-ray detector signal of the auxiliary X-ray detector 1786 exceeds a given threshold value, the RPM 322b pauses accumulation of radiation detection data, consistent with functions described in connection with FIG. 16. In an alternative implementation, the auxiliary X-ray detector 1786 includes a communication interface and outputs a blanking signal consistent with the embodiment of FIG. 13.

In yet other specific alternative implementations, one of the detectors 876 may be used as a transmission X-ray detector, detecting X-rays that have interacted with the vehicle 408. While an output signal from the transmission X-ray detector may be used for transmission X-ray imaging, such as by providing its output signal to the image generator 1788, the output signal, or a blanking signal based on the output signal, may further be provided to the RPM 322b to pause accumulation of radiation detection data when the transmission X-ray detector signal has exceeded a threshold, similar to either of the examples described above for the auxiliary X-ray detector 1786, and consistent with either the embodiment of FIG. 13 or the embodiment of FIG. 15.

Figure 18:
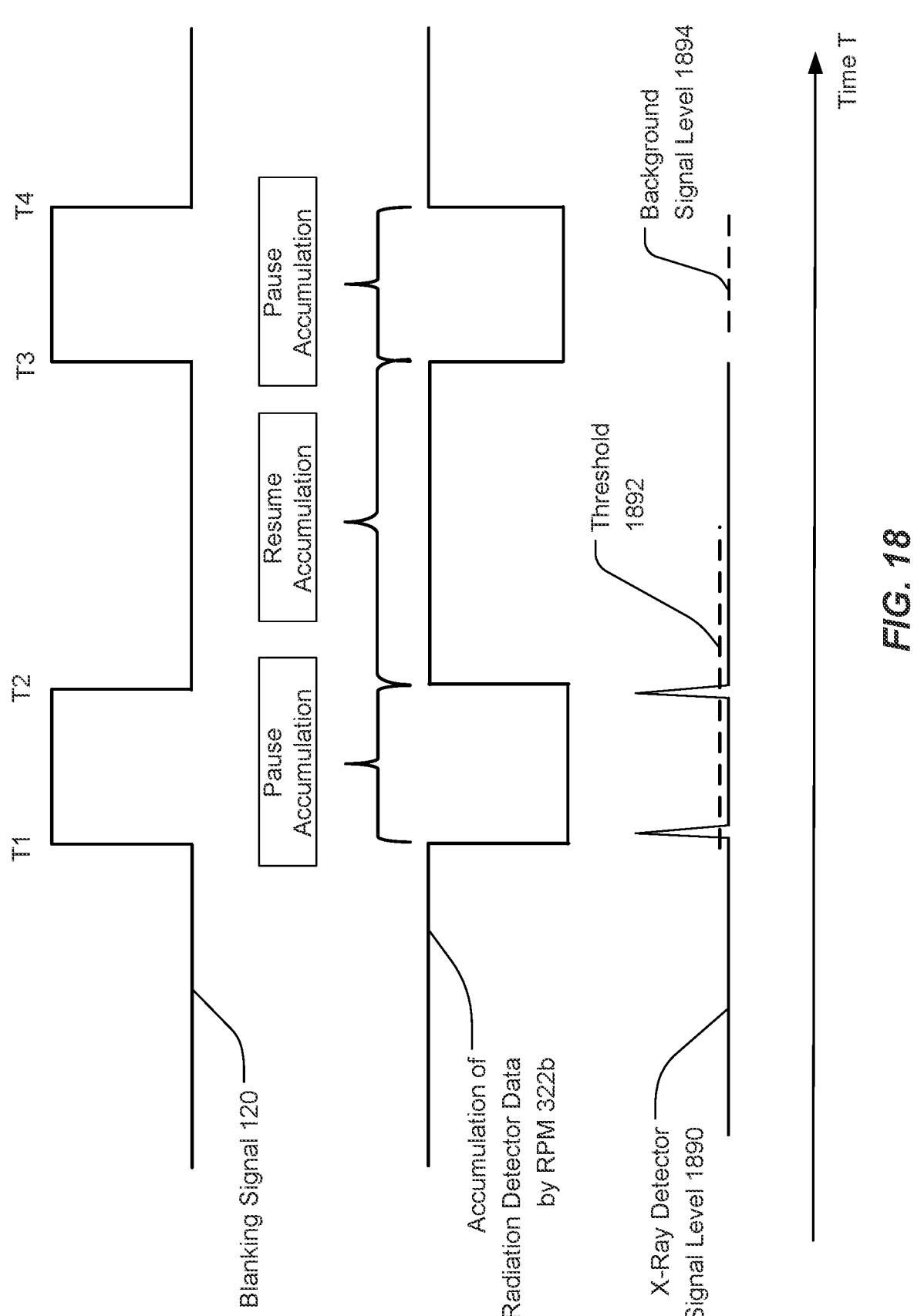
FIG. 18 is a graph of signals versus time showing example blanking signals, radiation detection data accumulation periods, and X-ray detector signal levels correlated with each other over time, which can be used to understand further various features of the X-ray scanning systems of FIGS. 12, 13, and 15.

FIG. 18 is a time diagram showing example blanking signals, radiation detection data accumulation periods, and X-ray detector signal levels correlated with each other over time T. Correlation of the blanking signal 120 and the accumulation of radiation detector data by the RPM 322b may be understood in reference to the X-ray scanning system 1200 FIG. 12, by way of example. Before time T1, the vehicle 408 has not been sensed by the feature sensor 104, the blanking signal 120 is in an OFF state, and the RPM 322b of FIG. 12 is continuing to accumulate radiation detector data. At time T1, the feature sensor 104 senses the front edge of the vehicle 408 and triggers the communication interface 106 to send the blanking signal 120 to the RPM 322b (with the blanking signal 120 indicating the ON state). Essentially at that same time T1, the RPM 322b responds to the blanking signal 120 by pausing accumulation of radiation detection data. During a time period between T1 and T2, the vehicle 408 intersects with the source X-rays 110, and accumulation of radiation detection data remains paused.

At time T2, which is just after the rear edge of the vehicle 408 passes the source X-rays 110, the rear edge of the vehicle 408 is sensed by the second feature sensor 1204, indicating that the vehicle 408 is clear of the source X-rays. At that time, the second feature sensor 1204 triggers the second communication interface 1206 to send the blanking signal 1220 in the OFF state. The RPM 322b receives the blanking signal 1220 in the OFF state and thus resumes accumulation of radiation detector data for a time period between T2 and T3.

At time T3, a front edge of a second vehicle 408 (not illustrated in FIG. 12) is detected by the feature sensor 104, and at time T4, the rear edge of the second vehicle 408 is detected by the second feature sensor 1204. Between the times T3 and T4 is a similar pause of accumulation of radiation detector data by the RPM 322b, corresponding to traversal of the second vehicle through the source X-rays 110. At time T4, accumulation of radiation detector data resumes.

FIG. 18 further illustrates an example X-ray detector signal level 1890, the use of which may be understood by reference to FIGS. 13 and 15, for example. The X-ray detector signal level 1890 is a characteristic of the X-ray detector signal 1382 illustrated in FIGS. 13 and 15, which is indicative of a rate of detection of the resultant X-rays 878 by the X-ray detector 1376. These embodiments utilize the X-ray detector signal 1382 output from the X-ray detector 1376 in order to make decisions about pausing accumulation of radiation detector data. The X-ray detector signal level 1890 can have a background signal level 1894, as illustrated in FIG. 18, which is a level of the X-ray detector signal when the target 108 is not intersecting with the source X-rays 110.

The X-ray detector signal level 1890 has two example spikes, just after T1 time T1, and just before time T2. The example spikes may be understood in reference to FIG. 12, and also in reference to FIGS. 14 and 16, which are specific implementations of the embodiments of FIGS. 13 and 15, respectively. The two example spikes occur when the front edge and rear edge of the vehicle 408 intersect with the source X-rays 110, respectively. These example spikes in the X-ray detector signal level 1890 can occur due to additional scattering of resultant X-rays from the front edge and rear edge of the vehicle 408, such as from the front bumper and rear bumper, respectively. When the X-ray detector signal level 1890 spikes, this can indicate when the RPM 322b of FIGS. 12, 14, and 16 can be expected to produce spurious radiation detection data due to detection of scattered X-rays. Accordingly, the spikes in the X-ray detector signal level 1890 can be used as a trigger to pause accumulation of radiation detection data. This can be done when the X-ray detector signal level 1890 exceeds a threshold 1892 that is just above the background signal level 1894, for example. Implementations consistent with the embodiments of FIGS. 13 and 15, such as FIGS. 14 and 16, respectively, may implement this logic. For example, in the embodiment of FIG. 13, the X-ray detector signal 1382 may be compared with the threshold value 1892 within the controller 1380. Alternatively, in the embodiment of FIG. 15, the X-ray detector signal level 1890 may be compared with the threshold 1892 within the radiation detector subsystem 1522, for example. More particularly, in the example implementation of FIG. 16, the comparison may take place using the digital comparator 1686.

Figure 19:
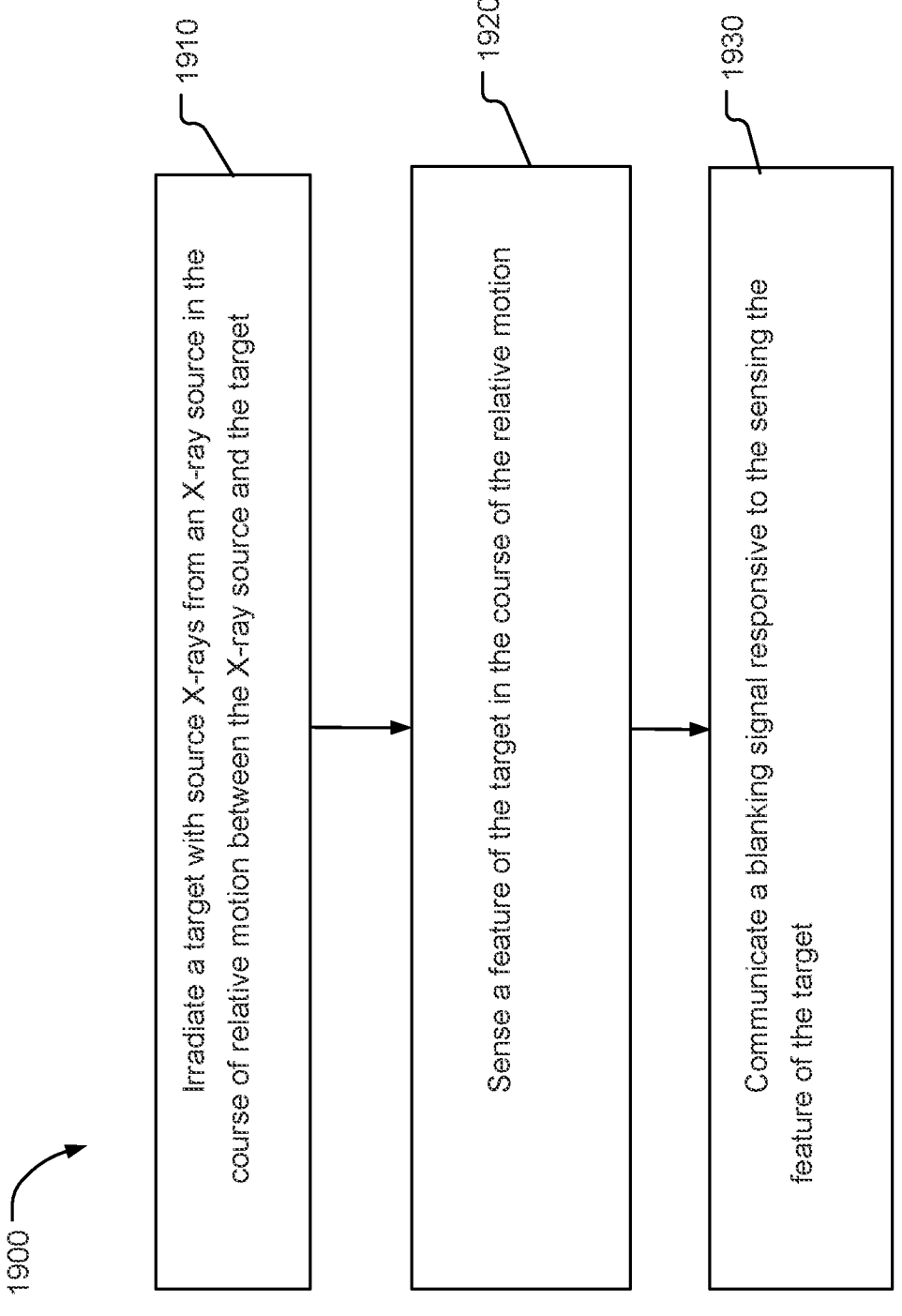
FIG. 19 is a flow diagram illustrating a method of X-ray scanning according to an embodiment, which may be performed by the X-ray scanning system of FIG. 1.

FIG. 19 is a flow diagram illustrating a method of X-ray scanning according to an embodiment, with further reference to FIGS. 1-18. At 1910, a target is irradiated with source X-rays from an X-ray source in the course of relative motion between the X-ray source and the target. At 1920, a feature of the target is sensed in the course of the relative motion. At 1930, a blanking signal is communicated responsive to the sensing the feature of the target.

Sensing the feature may be accomplished with a feature sensor, such as the feature sensor 104 of FIG. 1. In particular implementations, the feature sensor may be a camera system, such as the one FIG. 2A, a light source/receiver system (e.g., a laser curtain, such as the one of FIG. 2B, or a laser assembly, such as the one of FIG. 2C), a mechanical sensor, such as the one illustrated in FIG. 2D, or a combination these feature sensors. The blanking signal may be communicated to a radiation detector that is configured to receive the blanking signal and to pause an accumulation of radiation detector data responsive to the blanking signal. The radiation detector can be a radiation portal monitor, such as those illustrated in FIGS. 11-12, 14, and 17. Alternatively, the radiation detector may be any one of, or include a combination two or more of, the radiation detectors illustrated in FIG. 3.

The target may be a vehicle, such as that illustrated in FIG. 4, an article of luggage, such as that illustrated in FIG. 5, a package, a person, or a combination of two or more of these options. The feature of the target can be selected from any of the features illustrated in FIG. 4, for example, in the case of the target being a vehicle.

The X-ray source may form part of an X-ray beam-forming module, such as the X-ray beam-forming modules 558, 658a-c, 858, and 1758. The source X-rays may be formed into a beam selected from the group consisting of the scanning pencil beam 542 of FIG. 5, the stationary fan beam 538 of FIG. 5, stationary cone beam 762 of FIG. 7, or the scanning cone beam 764 of FIG. 7, for example. The X-ray beam forming module can be an undercarriage vehicle X-ray beamforming module, such as illustrated in FIGS. 11-12, 14, and 16-17; a side-view vehicle X-ray beam-forming module, such as illustrated in FIG. 17; or an overhead vehicle X-ray beamforming module, such as illustrated in FIG. 17.

Communicating the blanking signal may be performed by a communication interface that is either wired or wireless. The communication interface can form part of the feature sensor or can be operatively coupled to the feature sensor indirectly, through a controller, such as the controller 1380 the FIG. 17. In the case of indirect coupling, the feature sensor can be configured to output a feature sensor signal to the controller, and the controller can be configured to cause the communication interface to output the blanking signal responsive to the feature sensor signal, such as described in connection with FIG. 17.

Figure 20:
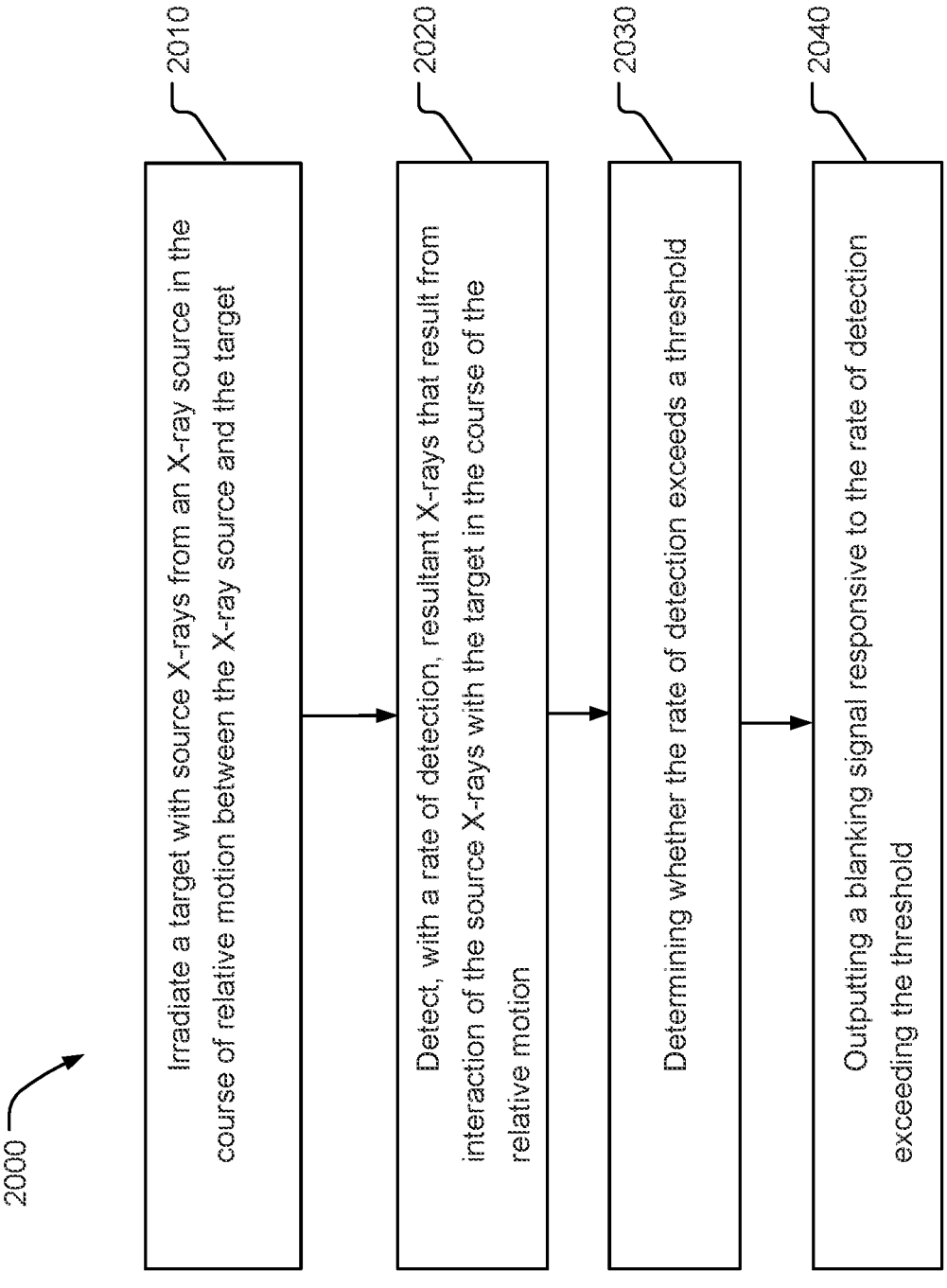
FIG. 20 is a flow diagram illustrating a method of X-ray scanning, according to another embodiment, which may be performed by the X-ray scanning system of FIG. 13.

FIG. 20 is a flow diagram illustrating a method of X-ray scanning 2000, according to another embodiment, with further reference to FIGS. 1-19. At 2010, a target is irradiated with source X-rays in the course of relative motion between the X-ray source and the target. At 2020, resultant X-rays that result from interaction of the source X-rays with the target in the course of the relative motion are detected with a rate of detection. At 2030, a determination is made about whether the rate of detection exceeds a threshold. At 2040, a blanking signal is output responsive to the rate of detection exceeding the threshold.

The irradiation of the target with the source X-rays from the X-ray source in the course of the relative motion, at 2010, may include any of the options described in connection with FIG. 19.

Detection of the resultant X-rays may be accomplished by an X-ray detector selected from the group consisting of the backscatter imaging X-ray detector, such as that illustrated in FIG. 8, a transmission imaging X-ray detector, such as that illustrated in FIG. 5, and an auxiliary scattering X-ray detector, such as that illustrated in FIG. 17.

The method 2000 may further include receiving the blanking signal at a radiation detector and pausing an accumulation of radiation detector data by the radiation detector responsive to the blanking signal. The radiation detector may be selected from any of those described in connection with FIG. 19. The target may be selected from any of those described in connection with FIG. 19. The resultant X-rays may be scattered from a feature of the target selected from the group consisting of any of the features described in connection with FIG. 4, for example.

Irradiation of the target with the source X-rays can include beamforming the source X-rays, such as by using an X-ray beamforming module selected from any of those described in connection with FIG. 19. Furthermore, the X-ray beamforming module may shape the beam into a shape selected from any of those described in connection with FIG. 19. Outputting the blanking signal can be done via a communication interface such as any of those described in connection with previous figures, either using a wired communication interface or a wireless communication interface. An entity selected from the group consisting of a controller, the communication interface, and a combination thereof may form part of the X-ray detector.

FIG. 21 is a flow diagram illustrating a method of X-ray scanning 2100 according to an embodiment. At 2110, a target is irradiated with source X-rays from an X-ray source in the course of relative motion between the X-ray source and the target. At 2120, resultant X-rays that result from interaction of the source X-rays with the target in the course of the relative motion are detected with a rate of detection. At 2130, an X-ray detector signal indicating the rate of detection is output to a radiation detector. At 2140, radiation detector data that is dependent upon the rate of detection are generated.

In one implementation, generating the radiation detector data dependent upon the rate of detection may include ceasing to accumulate radiation detection data if the X-ray detector signal exceeds a threshold, such as illustrated in FIG. 18. In another implementation, Generating the radiation detection data dependent upon the rate of detection may include subtracting a background related to the X-ray detector signal, such as the background signal level 1894 illustrated in FIG. 18. In various implementations of the method 2100, irradiating the target, the source X-rays, the X-ray source, the relative motion, the detection of resultant X-rays with the rate of detection, outputting the X-ray detector signal to a radiation detector, etc. may include any of the options described in connection with FIG. 20, for example.

The method 2100 may be performed using the X-ray scanning system 1500 of the embodiment of FIG. 15, or using the X-ray scanning system 1600 of the embodiment of FIG. 16, for example.

Implementation Clauses

Implementation examples are provided in the following numbered clauses. The numbered clauses represent some embodiments of the present invention and potential claims. (The actual claims provided at the end of this application). These clauses form a part of the written description of this application. Accordingly, subject matter of the following clauses may be presented as claims in later proceedings involving this application or any application claiming priority based on this application. Inclusion of such clauses should not be construed to mean that the claims do not cover the subject matter of the clauses. Thus, a decision to not present these clauses as claims in later proceedings should not be construed as a donation of the subject matter to the public.

Without limitation, potential subject matter that may be claimed includes:

Clause 1. An X-ray scanning system comprising:

a) an X-ray source configured to irradiate a target with source X-rays in the course of relative motion between the X-ray source and the target;

b) a feature sensor configured to sense a feature of the target in the course of the relative motion; and c) a communication interface operatively coupled to the feature sensor and configured to output a blanking signal responsive to the feature sensor sensing the feature of the target.

Clause 2. The X-ray scanning system of clause 1, wherein the feature sensor is selected from the group consisting of a camera system, a light source/receiver system, a mechanical sensor, and combinations thereof.

Clause 3. The X-ray scanning system of clause 1, further including a radiation detector configured to receive the blanking signal and to pause an accumulation of radiation detector data responsive to the blanking signal.

Clause 4. The X-ray scanning system of clause 3, wherein the radiation detector is a radiation portal monitor (RPM).

Clause 5. The X-ray scanning system of clause 3, wherein the radiation detector is selected from the group consisting of a personal radiation detector, a dosimeter, a radioisotope identifier, a gamma ray detector, a neutron detector, a radioactive contamination monitor, an alpha particle detector, a beta particle detector, a dirty bomb detector, a handheld detector, a radioactive material detector, a fissile material detector, and combinations thereof.

Clause 6. The X-ray scanning system of clause 1, wherein the target is a vehicle.

Clause 7. The X-ray scanning system of clause 6, wherein the feature of the target is selected from the group consisting of a bumper of the vehicle, a front edge of the vehicle, a rear edge of the vehicle, a front windshield of the vehicle, a rear windshield of the vehicle, a roof of the vehicle, a hood of the vehicle, a trunk of the vehicle, and combinations thereof.

Clause 8. The X-ray scanning system of clause 1, wherein the target is selected from the group consisting of a person, an article of luggage, a package, and combinations thereof.

Clause 9. The X-ray scanning system of clause 1, further including an X-ray beam-forming module of which the X-ray source forms a part, the X-ray beam-forming module configured to form the source X-rays into a beam selected from the group consisting of a scanning pencil beam, a stationary cone beam, a scanning cone beam, and a stationary fan beam.

Clause 10. The X-ray scanning system of clause 9, wherein the X-ray beam-forming module is selected from the group consisting of an undercarriage vehicle X-ray beam-forming module, a side-view vehicle X-ray beam-forming module, and an overhead vehicle X-ray beam-forming module.

Clause 11. The X-ray scanning system of clause 1, wherein the communication interface is selected from the group consisting of a wired communication interface and a wireless communication interface.

Clause 12. The X-ray scanning system of clause 1, wherein the communication interface forms a part of the feature sensor.

Clause 13. The X-ray scanning system of clause 1, wherein the communication interface is operatively coupled to the feature sensor through a controller that is configured to receive a feature sensor signal from the feature sensor and to cause the communication interface to output the blanking signal responsive to the feature sensor signal.

Clause 14. An X-ray scanning system comprising:
a) an X-ray source configured to irradiate a target with source X-rays in the course of relative motion between the X-ray source and the target;
b) an X-ray detector configured (i) to detect resultant X-rays that result from interaction of the source X-rays with the target in the course of the relative motion, and (ii) to output an X-ray detector signal indicating a rate of detection of the resultant X-rays;
c) a controller configured to receive the X-ray detector signal and to determine whether the rate of detection exceeds a threshold; and
d) a communication interface operatively coupled to the controller and configured to output a blanking signal responsive to the rate of detection exceeding the threshold.

Clause 15. The X-ray scanning system of clause 14, wherein the X-ray detector is selected from the group consisting of a backscatter imaging X-ray detector, a transmission imaging X-ray detector, and an auxiliary scattering X-ray detector.

Clause 16. The X-ray scanning system of clause 14, further including a radiation detector configured to receive the blanking signal and to pause an accumulation of radiation detector data responsive to the blanking signal.

Clause 17. The X-ray scanning system of clause 16, wherein the radiation detector is a radiation portal monitor (RPM).

Clause 18. The X-ray scanning system of clause 16, wherein the radiation detector is selected from the group consisting of a radioisotope identifier, a personal radiation detector, a dosimeter, a gamma ray detector, a neutron detector, a radioactive contamination monitor, an alpha particle detector, a beta particle detector, a dirty bomb detector, a handheld detector, a radioactive material detector, a fissile material detector, and combinations thereof.

Clause 19. The X-ray scanning system of clause 14, wherein the target is a vehicle.

Clause 20. The X-ray scanning system of clause 19, wherein the resultant X-rays are scattered from a feature of the target selected from the group consisting of a bumper of the vehicle, a front edge of the vehicle, a back edge of the vehicle, a front windshield of the vehicle, a rear windshield of the vehicle, a roof of the vehicle, a hood of the vehicle, a trunk of the vehicle, and combinations thereof.

Clause 21. The X-ray scanning system of clause 14, wherein the target is selected from the group consisting of a person, an article of luggage, a package, and combinations thereof.

Clause 22. The X-ray scanning system of clause 14, further including an X-ray beam-forming module of which the X-ray source forms a part, the X-ray beam-forming module configured to form the source X-rays into a beam selected from the group consisting of a scanning pencil beam, a stationary cone beam, a scanning cone beam, a stationary fan beam, and combinations thereof.

Clause 23. The X-ray scanning system of clause 22, wherein the X-ray beam-forming module is selected from the group consisting of an undercarriage vehicle X-ray beam-forming module, a side-view vehicle X-ray beam-forming module, and an overhead vehicle X-ray beam-forming module.

Clause 24. The X-ray scanning system of clause 14, wherein the communication interface is selected from the group consisting of a wired communication interface and a wireless communication interface.

Clause 25. The X-ray scanning system of clause 14, wherein an entity selected from the group consisting of the controller, the communication interface, and a combination thereof forms a part of the X-ray detector.

Clause 26. An X-ray scanning system comprising:
a) an X-ray source configured to irradiate a target with source X-rays in the course of a relative motion between the X-ray source and the target;
b) an X-ray detector configured (i) to detect resultant X-rays that result from interaction of the source X-rays with the target in the course of the relative motion, and (ii) to output an X-ray detector signal indicating a rate of detection of the resultant X-rays; and
c) a radiation detector subsystem configured to receive the X-ray detector signal and to generate radiation detection data dependent upon the rate of detection.

Clause 27. The X-ray scanning system of clause 26, wherein the radiation detector subsystem is further configured to cease to accumulate radiation detection data if the X-ray detector signal exceeds a threshold.

Clause 28. The X-ray scanning system of clause 26, wherein the radiation detector subsystem is further configured to generate radiation detection data by subtracting a background related to the X-ray detector signal.

Clause 29. A method of X-ray scanning, the method comprising:
a) irradiating a target with source X-rays from an X-ray source in the course of relative motion between the X-ray source and the target;
b) sensing a feature of the target in the course of the relative motion; and
c) communicating a blanking signal responsive to the sensing the feature of the target.

Clause 30. A method of X-ray scanning, the method comprising:
a) irradiating a target with source X-rays from an X-ray source in the course of relative motion between the X-ray source and the target;
b) detecting, with a rate of detection, resultant X-rays that result from interaction of the source X-rays with the target in the course of the relative motion;

c) determining whether the rate of detection exceeds a threshold; and d) outputting a blanking signal responsive to the rate of detection exceeding the threshold.

Clause 31. A method of X-ray scanning, the method comprising:

a) irradiating a target with source X-rays from an X-ray source in the course of relative motion between the X-ray source and the target;

b) detecting, with a rate of detection, resultant X-rays that result from interaction of the source X-rays with the target in the course of the relative motion;

c) outputting an X-ray detector signal to a radiation detector, the X-ray detector signal indicating the rate of detection; and d) generating radiation detector data dependent upon the rate of detection.

FINAL CONSIDERATIONS

The location of the RPM in the figures is representative only. The RPMs may be upstream or downstream of the X-ray detection system and may be situated at different distances from the X-ray scanning system.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An X-ray scanning system comprising:

an X-ray source configured to irradiate a target with source X-rays in the course of relative motion between the X-ray source and the target;

a feature sensor configured to sense a feature of the target in the course of the relative motion;

a radiation detector configured to detect passive radiation during the course of relative motion; and a communication interface operatively coupled to the feature sensor and configured to output a blanking signal, responsive to the feature sensor sensing the feature of the target, so as to pause an accumulation of passive radiation detector data from the radiation detector.

2. The X-ray scanning system of claim 1, wherein the feature sensor is selected from the group consisting of a camera system, a light source/receiver system, a mechanical sensor, and combinations thereof.

3. The X-ray scanning system of claim 1, wherein the radiation detector is configured to receive the blanking signal.

4. The X-ray scanning system of claim 1, wherein the radiation detector is a radiation portal monitor (RPM).

5. The X-ray scanning system of claim 1, wherein the radiation detector is selected from the group consisting of a personal radiation detector, a dosimeter, a radioisotope identifier, a gamma ray detector, a neutron detector, a radioactive contamination monitor, an alpha particle detector, a beta particle detector, a dirty bomb detector, a handheld detector, a radioactive material detector, a fissile material detector, and combinations thereof.

6. The X-ray scanning system of claim 1, wherein the target is a vehicle.

7. The X-ray scanning system of claim 6, wherein the feature of the target is selected from the group consisting of a bumper of the vehicle, a front edge of the vehicle, a rear edge of the vehicle, a front windshield of the vehicle, a rear windshield of the vehicle, a roof of the vehicle, a hood of the vehicle, a trunk of the vehicle, and combinations thereof.

8. The X-ray scanning system of claim 1, wherein the target is selected from the group consisting of a person, an article of luggage, a package, and combinations thereof.

9. The X-ray scanning system of claim 1, further including an X-ray beam-forming module of which the X-ray source forms a part, the X-ray beam-forming module configured to form the source X-rays into a beam selected from the group consisting of a scanning pencil beam, a stationary cone beam, a scanning cone beam, and a stationary fan beam.

10. The X-ray scanning system of claim 9, wherein the X-ray beam-forming module is selected from the group consisting of an undercarriage vehicle X-ray beam-forming module, a side-view vehicle X-ray beam-forming module, and an overhead vehicle X-ray beam-forming module.

11. The X-ray scanning system of claim 1, wherein the communication interface is selected from the group consisting of a wired communication interface and a wireless communication interface.

12. The X-ray scanning system of claim 1, wherein the communication interface forms a part of the feature sensor.

13. The X-ray scanning system of claim 1, wherein the communication interface is operatively coupled to the feature sensor through a controller that is configured to receive a feature sensor signal from the feature sensor and to cause the communication interface to output the blanking signal responsive to the feature sensor signal.

14. An X-ray scanning system comprising:

an X-ray source configured to irradiate a target with source X-rays in the course of relative motion between the X-ray source and the target;

an X-ray detector configured (i) to detect resultant X-rays that result from interaction of the source X-rays with the target in the course of the relative motion, and (ii) to output an X-ray detector signal indicating a rate of detection of the resultant X-rays;

a controller configured to receive the X-ray detector signal and to determine whether the rate of detection exceeds a threshold;

a radiation detector configured to detect passive radiation during the course of relative motion; and a communication interface operatively coupled to the controller and configured to output a blanking signal, responsive to the rate of detection exceeding the threshold, so as to pause an accumulation of passive radiation detector data from the radiation detector.

15. The X-ray scanning system of claim 14, wherein the X-ray detector is selected from the group consisting of a backscatter imaging X-ray detector, a transmission imaging X-ray detector, and an auxiliary scattering X-ray detector.

16. The X-ray scanning system of claim 14, wherein the radiation detector is configured to receive the blanking signal.

17. The X-ray scanning system of claim 14, wherein the radiation detector is a radiation portal monitor (RPM).

18. The X-ray scanning system of claim 14, wherein the radiation detector is selected from the group consisting of a radioisotope identifier, a personal radiation detector, a dosimeter, a gamma ray detector, a neutron detector, a radioactive contamination monitor, an alpha particle detector, a beta particle detector, a dirty bomb detector, a handheld detector, a radioactive material detector, a fissile material detector, and combinations thereof.

19. The X-ray scanning system of claim 14, wherein the target is a vehicle.

20. The X-ray scanning system of claim 19, wherein the resultant X-rays are scattered from a feature of the target selected from the group consisting of a bumper of the vehicle, a front edge of the vehicle, a back edge of the vehicle, a front windshield of the vehicle, a rear windshield of the vehicle, a roof of the vehicle, a hood of the vehicle, a trunk of the vehicle, and combinations thereof.

21. The X-ray scanning system of claim 14, wherein the target is selected from the group consisting of a person, an article of luggage, a package, and combinations thereof.

22. The X-ray scanning system of claim 14, further including an X-ray beam-forming module of which the X-ray source forms a part, the X-ray beam-forming module configured to form the source X-rays into a beam selected from the group consisting of a scanning pencil beam, a stationary cone beam, a scanning cone beam, a stationary fan beam, and combinations thereof.

23. The X-ray scanning system of claim 22, wherein the X-ray beam-forming module is selected from the group consisting of an undercarriage vehicle X-ray beam-forming module, a side-view vehicle X-ray beam-forming module, and an overhead vehicle X-ray beam-forming module.

24. The X-ray scanning system of claim 14, wherein the communication interface is selected from the group consisting of a wired communication interface and a wireless communication interface.

25. The X-ray scanning system of claim 14, wherein an entity selected from the group consisting of the controller, the communication interface, and a combination thereof forms a part of the X-ray detector.

26. A method of X-ray scanning, the method comprising:
irradiating a target with source X-rays from an X-ray source in the course of relative motion between the X-ray source and the target;
sensing a feature of the target in the course of the relative motion;
accumulating passive radiation detector data during the course of relative motion; and
communicating a blanking signal, responsive to the sensing the feature of the target, so as to pause the accumulating passive radiation detector data.

27. A method of X-ray scanning, the method comprising:
irradiating a target with source X-rays from an X-ray source in the course of relative motion between the X-ray source and the target;
detecting, with a rate of detection, resultant X-rays that result from interaction of the source X-rays with the target in the course of the relative motion;
determining whether the rate of detection exceeds a threshold;
accumulating passive radiation detector data during the course of relative motion; and
outputting a blanking signal, responsive to the rate of detection exceeding the threshold, so as to pause the accumulating passive radiation detector data.

\* \* \* \* \*